April 6, 1954　　　D. SANTINI ET AL　　　2,674,348
AUTOMATIC LANDING AND LEVELING ELEVATOR SYSTEMS
Filed June 9, 1950

INVENTORS
Danilo Santini, Phillip C. Keiper
and Milton Fink.
BY
ATTORNEY

April 6, 1954  D. SANTINI ET AL  2,674,348
AUTOMATIC LANDING AND LEVELING ELEVATOR SYSTEMS
Filed June 9, 1950  6 Sheets-Sheet 2

INVENTORS
Danilo Santini, Phillip C. Keiper
and Milton Fink.
ATTORNEY

INVENTORS
Danilo Santini,
Phillip C. Keiper
and Milton Fink.
ATTORNEY

Patented Apr. 6, 1954

2,674,348

UNITED STATES PATENT OFFICE 2,674,348

AUTOMATIC LANDING AND LEVELING ELEVATOR SYSTEM

Danilo Santini, Tenafly, and Phillip C. Keiper, Shrewsbury, N. J., and Milton Fink, Forest Hills, N. Y., assignors to Westinghouse Electric Corporation, East Pittsburgh, Pa., a corporation of Pennsylvania Application June 9, 1950, Serial No. 167,201

46 Claims. (Cl. 187—29)

This invention relates to elevator systems and it has particular relation to elevator systems equipped for automatic landing and leveling.

In order to provide efficient operation of an electric elevator system, it is desirable that a minimum of time be expended in landing or leveling an elevator car at any landing at which it is to stop. It has been found that appreciable improvement in the efficiency of an elevator system results from the adoption of automatic landing and also from the adoption of automatic leveling, if leveling is desired. In the automatic landing of an elevator car it is well understood that as the elevator car approaches a landing at which it is to stop, the car is retarded in accordance with a predetermined pattern and the elevator brake is finally applied at a predetermined point such that the elevator car comes to an accurate stop at the desired landing.

If the elevator system also includes equipment for providing automatic leveling, the elevator car may be maintained accurately at the desired landing under all conditions. For example, if the elevator car tends to drop from the landing as it receives load due to cable stretch, the automatic leveling equipment returns the elevator car into accurate registration with the desired landing.

If the elevator system is employed for passenger service, the retardation of the elevator car during a landing operation must be sufficiently smooth and the stop must be sufficiently gentle to avoid discomfort for the elevator car passengers. In addition, shocks which may damage the equipment employed in the elevator system must be avoided. If automatic leveling is provided, similar comments are applicable.

It has been found that the regulating generator when employed with a variable voltage system is particularly effective in providing rapid, smooth and accurate acceleration and retardation of an elevator car. As representative of prior art systems employing regulating generators, reference may be made to the Santini, et al. Patent 2,094,377 and the King Patent 2,205,204. A further example of a regulating generator employed in an elevator system will be found in the Esselman patent application Serial No. 75,888, filed February 11, 1949 which has issued on October 31, 1950, as Patent 2,528,126.

The regulating generator conventionally is employed in a Wheatstone bridge circuit for controlling the field excitation of the main generator employed in a variable voltage system. One arm of the bridge includes, in series, a field winding of the main generator and a field winding of the regulating generator. The armature of the regulating generator is connected across one diagonal of the bridge.

In a preferred embodiment of the invention, a regulating generator for controlling the field excitation of a main generator employed in a variable voltage system for energizing an elevator driving motor is connected in what may be termed "split" Wheatstone bridge circuit. The main generator is provided with two field windings which are disposed in separate arms of the split bridge. In a somewhat analogous manner, the regulating generator has two field windings, each connected in series with a separate field winding of the main generator in the bridge. By dividing the field windings between two arms of the bridge, the resultant inductance of the field windings is decreased and the time constant of the bridge circuit is materially reduced. By adoption of the split bridge, the excitation of the main generator may be changed rapidly in accordance with any desired pattern and any deviation of the main generator from the desired pattern is rapidly corrected. The rapid response of the main generator is obtained with no loss in the smoothness of the response. As applied to an elevator system, the split bridge permits the adoption of a faster change in the pattern controlling the operation of the main generator and results in a substantial decrease in the required distance and time required for retarding an elevator car during a landing operation.

A further improvement in the control exercised by the regulating generator is obtained by providing the regulating generator with a plurality of pattern fields which may be employed separately or in combination as desired. Thus, for normal floor-to-floor operation of the elevator car, one of the pattern fields alone may be employed. During a leveling operation, two of the patter fields may be employed in order to increase the rate at which the voltage of the main generator is increased.

In automatic landing and leveling systems, it has been conventional to employ inductor relays for controlling accurately the desired slow down and stopping points of the elevator car. Such inductor relays are located at predetermined distances from each of the landings at which the elevator car is to stop. Because of the rapid retardation and response of the elevator car resulting from adoption of the split bridge, it is possible to employ an improved inductor relay assembly. In this assembly, a plurality of inductor relays is positioned on the elevator car for cooperation with a single inductor plate. In a preferred embodiment of the invention, five inductor relays are mounted in vertical alignment on an elevator car. As the elevator car approaches a landing at which it is to stop, certain of the inductor relays are operated successively at suitable distances from the landing. For example, the relays may be operated respectively when the elevator car is 20½ inches, 10 inches, 2½ inches and ½ inch from the landing. Two of the inductor relays also are employed in the preferred embodiment for initiating a leveling operation of the elevator car if such leveling is required.

To illustrate the improved response of a system involving the invention, it may be pointed out that the invention permits the elevator car to approach the landing at which it is to stop more rapidly and yet slow to a stopping speed which is ⅓ to ¼ of the stopping speeds heretofore employed. Thus, the elevator car may travel at a speed of 160 feet per minute as it reaches a point 20½ inches from a landing at which it is to stop. The speed then is decreased to a value of the order of 60 feet per minute at a point 10 inches from a landing. The speed again is decreased to a value of the order of 25 feet per minute by the time the car reaches a distance of 2½ inches from the landing. The elevator car then is retarded to a stopping speed of the order of 5 to 10 feet per minute by the time it reaches a point ½ inch from the landing. At this last point, the elevator brake is applied and the elevator car drifts the remaining ½ inch to an accurate stop at the desired landing. Inasmuch as the elevator car doors are opening during the final 2½ inches of its movement, it is clear that the invention provides an extremely rapid and effective landing operation.

Although the leveling operation is suitable for passenger elevators, it is particularly desirable for freight elevators. The rapid, smooth and accurate leveling operation permits rapid movement of power trucks during the loading and unloading of the elevator car. In order to provide this improved leveling operation, the invention includes a load weighing device, a motion detector and the previously mentioned dual-action regulating generator having two sets of pattern fields.

The load weighing device provides a control which is responsive to the magnitude of the load on the elevator car and distinguishes between hauling and overhauling loads. The motion detector provides a control which is responsive to the initiation of movement of the driving motor of the elevator car during a leveling operation.

The leveling operation to compensate for cable stretch depends to a substantial extent on the elevator car load which is measured by the load weighing device. It is conventional in the art to employ a counterweight for the elevator car which compensates for the weight of the elevator car and a substantial portion of the load carried by the elevator cars which may be 40% of the full, rated load. If the load on the elevator car is within the balanced zone, (i. e. substantially 40% of the full, rated load) the elevator brake may be released without fear that the elevator car will move appreciably before torque can be developed by the elevator driving motor. Consequently, when an elevator car having a balanced load is to be leveled, the load weighing device is effective for initiating a prompt release of the elevator brake and the elevator car moves as soon as torque is developed by the driving motor.

If the load on the elevator car is unbalanced, release of the elevator brake would result in car movement unless the elevator driving motor has developed a torque sufficient to hold a car prior to release of the brake. If the load, as measured by the load weighing device, is unbalanced and if leveling is to be effected in the hauling direction, the brake release is delayed until a torque sufficient to hold the load is produced by the motor. The delay in brake release is proportional to the load on the motor.

If the load measured by the load weighing device is unbalanced and if leveling is to be in the overhauling direction, the brake is only partially released. Under these conditions, leveling is effected "through" the brake.

During the leveling operation, the regulating generator has all of the pattern fields connected for energization in order to force the generator voltage to build up as rapidly as possible. However, as soon as the motion detector detects the beginning of a releveling movement of the driving motor, the forcing of the main generator voltage is decreased.

The rapidity of the leveling operation may be appreciated when it is pointed out that with 15% to 70% of rated load on the elevator car, the elevator car may be leveled in either direction in less than 1 second.

Several different operations of the elevator brake are provided. During a normal landing operation of the elevator car, a smooth, soft brake is employed. Should the elevator car overrun a floor during a landing operation, the setting of the elevator brake is retarded to prevent it from setting before the elevator car reverses during the leveling operation. This prevents the production of a jar or bump at the point of reversal. At the close of a leveling operation for overrun, the elevator brake is set with a fast, hard action. In releveling to compensate for cable stretch or contraction, an even faster and harder brake action may be employed.

From the foregoing it will be noted that the braking effort is controlled to provide various brake actions. The braking effort may be modified to stop the car faster for a leveling operation than for a landing operation. Although this modification in braking effort may be effected by varying the ultimate braking force, in a preferred embodiment it is effected by changing the rate at which the braking force is built up, the ultimate force always being the same.

It is accordingly a first object of the invention to provide an elevator system having a variable voltage drive wherein field excitation for the variable voltage generator is controlled by a regulating generator connected in a split bridge circuit.

It is a second object of the invention to provide an elevator system employing an improved inductor assembly wherein a plurality of inductor relays is arranged in alignment for operation by a common inductor plate.

It is a third object of the invention to provide an elevator system having an elevator car which automatically lands and levels with a load weighing device which controls the operation of the system during leveling in accordance with the load on the elevator car.

It is a fourth object of the invention to provide an elevator system as set forth in the preceding paragraph wherein a motion detector is responsive to movement of the elevator car during a leveling operation for modifying the system operation.

It is a fifth object of the invention to provide an elevator system wherein leveling in an overhauling direction is effected with the elevator brake partially applied.

It is a sixth object of the invention to provide an elevator system wherein the elevator brake is released for a leveling operation after a delay sufficient to permit the elevator motor to develop enough torque to hold the elevator car.

It is a seventh object of the invention to provide an elevator system having an elevator brake which is applied with a soft braking action, a hard braking action, or after a substantial delay under different conditions.

It is an eighth object of the invention to provide an elevator system of the automatic landing and leveling type wherein an elevator brake provides a soft braking action for a normal landing operation of the elevator car, a hard braking action to stop the elevator car at the close of a leveling operation, to compensate for overrun, a very hard braking action at the close of a leveling operation to compensate for cable stretch or contraction, and a delayed braking action if the elevator car overshoots a landing during a landing operation.

The invention also has for its objects the provision of an elevator system incorporating any combination of two or more of the foregoing objects.

Other objects of the invention will be apparent from the following description taken in conjunction with the accompanying drawings in which:

Figs. 5 and 5A are placed in horizontal alignment, it will be found that corresponding coils and contacts of the two figures are substantially in horizontal alignment.

Figs. 6 and 6A are placed in horizontal alignment, it will be found that corresponding contacts and coils of the two figures are substantially in horizontal alignment.

Figures 1, 2:
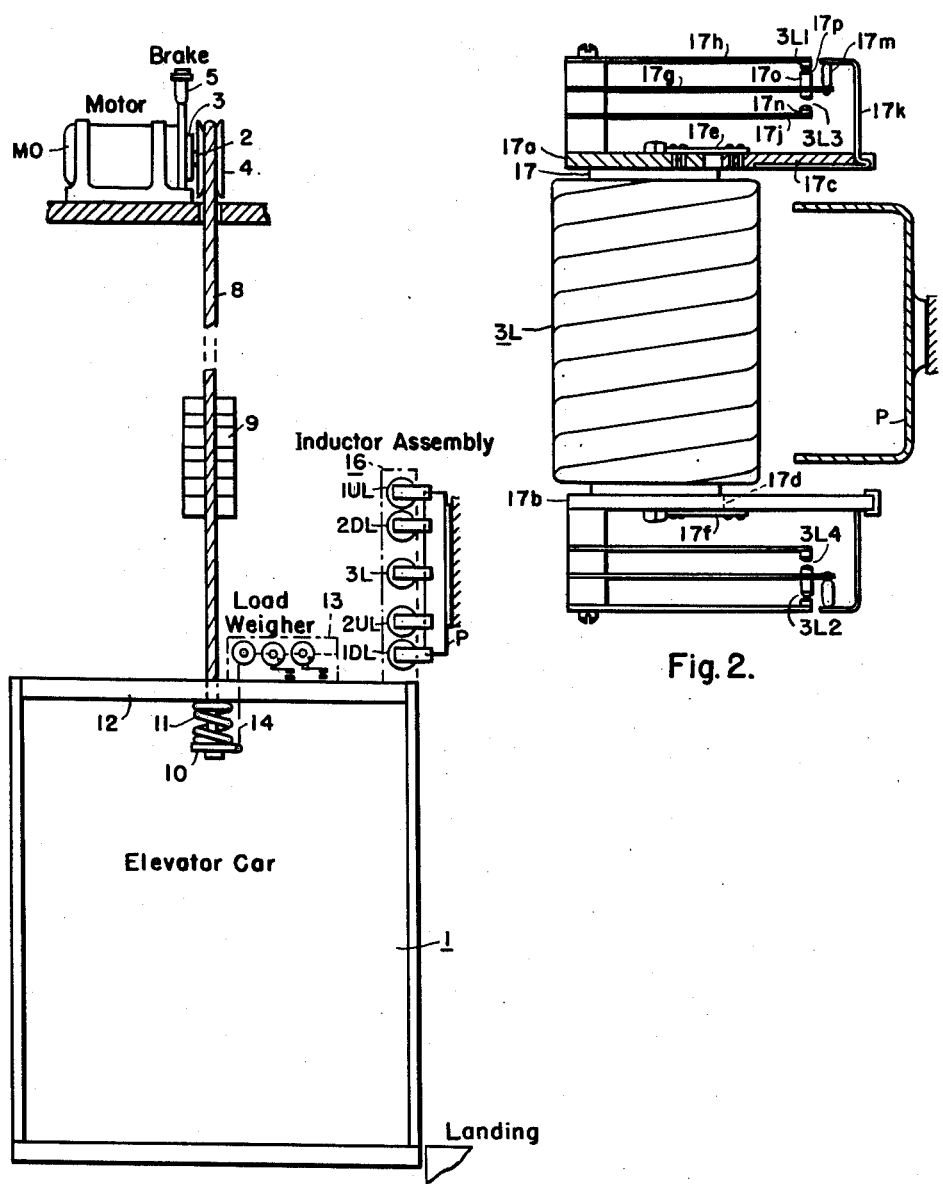
Figure 1 is a view in elevation with parts broken away and parts shown schematically of an elevator system incorporating the invention.
Fig. 2 is a view in top plan with parts shown in section of an inductor relay assembly suitable for the system of Fig. 1.

The invention may be incorporated in various types of elevator systems. For example, it may be employed in an automatic elevator system wherein the elevator car is started in response to operation of a car push button located in the elevator car or a corridor push button located at any of the landings served by the elevator car. As a further example, the invention may be incorporated in a system wherein the elevator car is started by means of a car switch and is stopped at landings served by the elevator car in response to operation of a car push button or a corridor push button for each desired landing. However, the invention may be described adequately for an automatic landing and leveling elevator system of the car switch type. Although the invention is described as incorporated in the car switch operated elevator system, it is to be understood that this system represents only one embodiment of the invention and that the invention may be incorporated in other types of elevator systems.

Inasmuch as a large number of relays, contactors, or switches are employed, a standard convention has been adopted for designating such system components. Each of the switches, relays or contactors is identified by a suitable reference character. Each set of contacts of each switch, relay or contactor is identified by the appropriate reference character therefor, followed by an identifying numeral specific to the set of contacts. For example, the expression U1 designates the first set of contacts of the up switch U. As a further example, the expression U4 designates the fourth set of contacts of the up switch U.

A switch, relay or contactor may have break (back) contacts or make (front) contacts. It will be understood that the break contacts of a relay or other device are closed when the relay or other device is deenergized and open when the relay or other device is energized sufficiently to pick up. On the other hand, make contacts of a relay or other device are open when the relay or other device is deenergized and are closed when the relay or other device is energized sufficiently to pick up. Unless otherwise stated, the various circuit components are illustrated in their deenergized conditions.

In order to facilitate reference to the specification and drawings, the following apparatus list is presented:

APPARATUS LIST

GR6—Full speed relay
E1–E4—Light-load contacts
F1–F6—Heavy-load contacts
WA, WB, WC, WD—Auxiliary load contacts
B—Loop voltage relay
BR—Brake-released relay
7—Running contactor
MD—Motion detector relay
MDA—Motion detector advancer
LW1–LW4—Load zone relays
BA—Brake relay
UR—Up relay
DR—Down relay
6——Running relay
80——Auxiliary running relay
U—Up switch
D—Down switch
6T—Timing relay
40—Door relay
32B—Cable-stretch relay
BC—Brake-modifier relay
LU—Up leveling relay
LD—Down leveling relay
L1—Third landing relay
L2—Second landing relay
L3—Leveling-field-control relay
65—Brake regulator relay
MT—Timing relay
72T—Timing relay
1UL, 2DL, 3L, 2UL, 1DL—Inductor relays.

APPARATUS IN FIGURE 1

In Fig. 1, an elevator car 1 is mounted in the hoist-way of a building structure for the purpose of serving the floors or landings of the building structure. In Fig. 1 the elevator car is shown stopped at one of the landings of the structure.

In order to move the elevator car through the hoist-way, a motor MO is located in a penthouse provided in the structure. This motor has a shaft 2 on which a brake drum 3 and a sheave 4 are secured. A brake 5 is provided for applying a brake shoe to the drum 3 in order to prevent or resist rotation of the shaft 2.

A rope or cable 8 passes over the sheave 4. One end of the cable 5 is secured to a counterweight 9. The remaining end of the cable is secured to a plate 10. A compression spring 11 is located between the plate 10 and a crossbeam 12 which is secured to the elevator car.

The compression spring 11 is compressed between the plate 10 and the crossbeam 12 in accordance with the load on the elevator car. Consequently, the distance between the plate and the crossbeam is a measure of the car loading.

Figure 3:
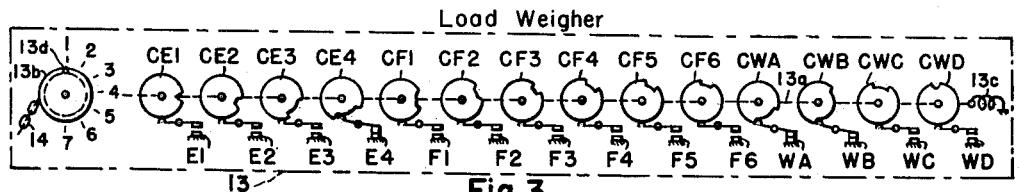
Fig. 3 is a schematic view of a load weighing device suitable for the elevator system of Fig. 1.

In order to measure the loading of the elevator car, a load weigher 13 is secured to the crossbeam 12. The mechanism of the load weigher is connected to the plate 10 through a flexible cable or chain 14. The load weigher includes a plurality of electrical contacts which are closed and opened in accordance with the loading of the elevator car. These contacts will be discussed more fully in connection with Figs. 3 and 4.

Suitable mechanism is provided for detecting accurately the distance of the elevator car from a landing at which it is to stop. Mechanism of this type is well known in the art and conventional mechanism may be employed for this purpose. However, Fig. 1 shows an improved and preferred embodiment in the form of an inductor assembly 16.

The inductor assembly 16 includes five inductor relays 1UL, 2DL, 3L, 2UL and 1DL. These relays cooperate with a single inductor plate P for each of the landings to provide slowdown and leveling controls for the elevator car. Thus, if the elevator car 1 is travelling up towards a landing at which it is to stop, the inductor relay 1UL is the first of the inductor relays to reach the plate P for the desired landing. This inductor relay 1UL consequently operates a predetermined distance from the floor, such as 20½ inches to initiate a slowdown of the elevator car.

As the elevator car continues its upward travel, the plate P completes a magnetic circuit for the inductor relay 2DL, but this relay is not effective for control purposes during such upward travel of the elevator car.

When the elevator car reaches a point approximately 10 inches from the desired landing, the plate P completes a magnetic circuit for the inductor relay 3L. This relay initiates a further slowdown of the elevator car. When the elevator car is approximately 2½ inches from the desired landing, the plate P completes a magnetic circuit for the inductor relay 2UL and this relay operates to slow the elevator car to a landing speed.

Approximately ½ inch from the desired landing, the inductor plate P begins to leave the inductor relay 1UL. This relay thereupon drops out to initiate application of the elevator brake and the elevator car stops accurately at the desired landing.

It will be noted that the inductor relays 1UL and 1DL are adjacent the ends of the inductor plate P while the elevator car is stopped at a landing. If the elevator car overshoots the desired landing or if the car fails to register with the landing because of cable stretch, one of these relays 1UL or 1DL is effective for initiating a leveling operation of the elevator car.

APPARATUS IN FIGURE 2

The inductor relays all are of similar construction. Consequently a description of the inductor relay 3L will suffice. The inductor relay 3L has a coil which is wound on a magnetic core 17. At each end, the magnetic core 17 has a polar plate 17a or 17b. Each of the polar plates has a slot within which a magnetic armature 17c or 17d is positioned. These armatures are hinged in any suitable manner to their associated polar plates. In the specific embodiment of Fig. 2, the armature 17c is hinged on the polar plate 17a by means of a flexible springs 17e. In a similar manner, the armature 17d is hinged on the polar plate 17b by means of leaf spring 17f.

It will be noted that a long airgap is between the armatures 17c and 17d. When the inductor relay reaches the inductor plate P, the airgap is bridged substantially by the inductor plate. Consequently, if the coil of the inductor plate is energized, the forces applied to the armatures are sufficient to move the armatures against the biases of their associated springs towards each other. Such movements of the armatures are employed for operating suitable contacts.

Break contacts 3L1 and make contacts 3L3 are operated by the armature 17c. For this purpose, a leaf spring 17g is positioned between strips 17h and 17j. The spring 17g and the strip 17h are biased normally into engagement with each other. Such engagement provides the contacts 3L1. The spring 17g and the strip 17j are normally biased out of engagement with each other to provide the make contacts 3L3.

It will be understood that the spring and strip when separated are insulated from each other. When the armature 17c is moved toward the inductor plate by magnetic forces, an arm 17k secured to the armature operates through a link 17m to move the spring 17g out of engagement with the strip 17h and into engagement with the strip 17j.

Although the spring and strips could engage each other directly, contact buttons 17n, 17o and 17p, may be secured to the ends of the spring and strips for the purpose of effecting the desired engagement.

In this way, each of the inductor relays may provide either a make contact or a break contact or the relay may provide both make and break contacts as desired. The armature 17d may operate the contacts 3L2 and 3L4 in an analogous manner. However, it is believed that a discussion of the contacts operated by the armature 17c suffices for present purposes. The inductor relay of Fig. 2 also is incorporated in the Berkovitz patent application, Serial No. 129,665, filed November 26, 1949, and assigned to the assignee of the present patent application.

APPARATUS IN FIGURE 3

The load weigher 13 is employed for operating contacts E1 to E4, F1 to F6 and WA to WD in accordance with the loading of the elevator car. These contacts all are biased towards their closed positions and are opened by means of individual cams which are mounted on a common shaft 13a. The cams for the contacts are identified by the same reference character preceded by the letter C. Thus, the contacts E1 are operated by the cam CE1. As a further example, the contacts WA are operated by the cam CWA.

The shaft 13a has secured thereto a drum 13b to which one end of the chain 14 is secured. The shaft is biased by a spiral spring 13c in a direction which maintains the chain 14 taut. The configuration of the cams may be understood from a consideration of Fig. 4. In order to facilitate a discussion of the operation of the load weigher, seven positions of the shaft are illustrated on a scale shown in Fig. 3. The drum 13b has a pointer 13d which indicates on the scale the position of the shaft. The position 1 corresponds to an unloaded or empty elevator car. When the pointer 13d is adjacent the position 7 of the scale, the elevator car is fully loaded. Intermediate loadings of the elevator car are represented by intermediate points on the scale.

APPARATUS IN FIGURE 4

Figure 4:
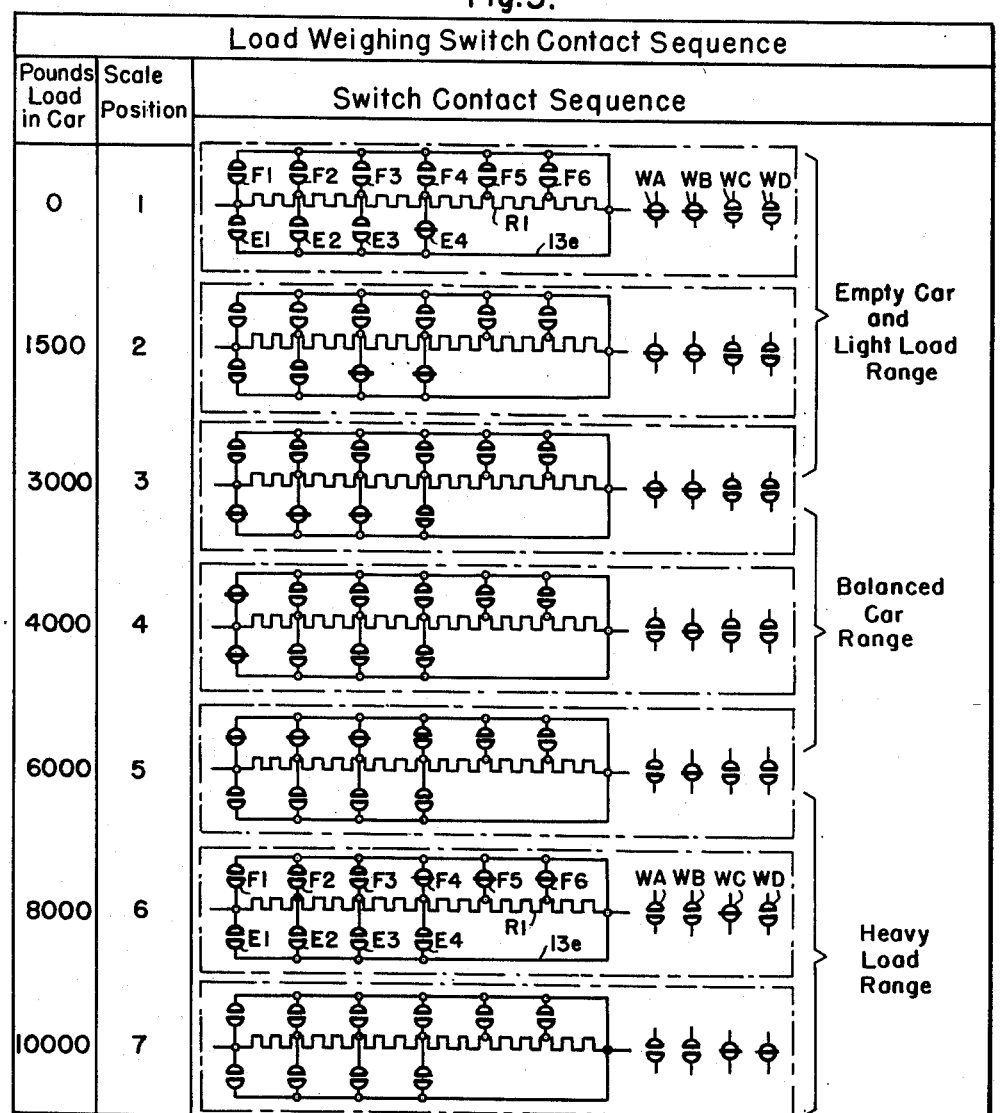
Fig. 4 is a schematic view showing the positions of the contacts in the load weighing device of Fig. 3 for various loadings of an associated elevator car.

In Fig. 4, the conditions of the contacts of the load weigher are shown for seven different loadings of the elevator car. These seven loadings correspond to the seven positions indicated on the scale of Fig. 3. It will be assumed that the elevator car has a full load rating of 10,000 pounds. The loading of the elevator car is indicated in the first column of Fig. 4. The scale position corresponding to such loading is illustrated in the second column of Fig. 4. The contact positions for each loading are illustrated in the third column of Fig. 4.

It will be noted that when the elevator car is completely unloaded or empty, all of the contacts, E1, E2, E3 and F1 to F6 are open. Contacts E4 are closed at this loading. The contacts WA and WB both are closed. The contacts WC and WD both are open. As the loading of the elevator car increases, the contacts, E3, E2, E1, successively close until the loading of the elevator car reaches a balanced range.

It will be recalled that the counterweight of the elevator car is proportioned to counterbalance the weight of the elevator car and a portion of the rated loading of the elevator car, usually approximately 40% of the rated loading. The balanced range in Fig. 4 is indicated to cover a loading of approximately 3,000 to 6,000 pounds.

As the loading of the elevator car continues to increase in the balanced range, the contacts E4 to E1 successively open and the contacts F1 to F6 successively close. As the loading approaches the rated capacity of the elevator car, the contacts F1 to F6 successively open until, for the fully loaded elevator car, the contacts F1 to F6 and E1 to E4 are all open.

One terminal of each of the contacts E1 to E4 and F1 to F6 is connected to a common conductor 13e and to one terminal of a resistor R1. The remaining terminal of each of the contacts is connected to a tap on the resistor R1. The purpose of these contacts is to adjust the effective resistance offered by the resistor R1 in accordance with the loading of the elevator car. The maximum effective resistance is provided when the elevator car is fully loaded. The effective resistance of the resistor R1 is substantially larger for an empty car than that for a car carrying a balanced load. Minimum resistance of the resistor R1 is provided when the loading of the elevator car is a balanced loading. Intermediate values of resistance are provided for intermediate loadings. As will be pointed out in the discussion of Fig. 5, the effective resistance offered by the resistor R1 is employed for controlling the time of release of the elevator brake for a leveling operation.

The contacts WA, WB, WC and WD are employed for controlling certain load zone relays and indirectly the excitation of the main generator supplying energy to the elevator driving motor in accordance with the loading of the elevator car. The contacts WA are closed in the light-load range of loading. They are open in the balanced load range and also are open for heavier loadings of the elevator car.

The contacts WB are closed in both the light-load range and the balanced car range and are open only in the heavy-load range.

The contacts WC are open in the light-load range and in the balanced car range. They close for a loading of the order of 70% of rated load and remain closed as the loading increases to the rated load. For example, the contacts WC may be closed for the final two-thirds of the heavy-load range. The contacts WD are open except for the latter portion of the heavy-load range. Thus, the contacts WD may be closed over the final one third of the heavy-load range. The operation of the contacts WC and WD compensates for the increased static friction due to the loading of the system.

APPARATUS IN FIGURE 5

Figure 5:
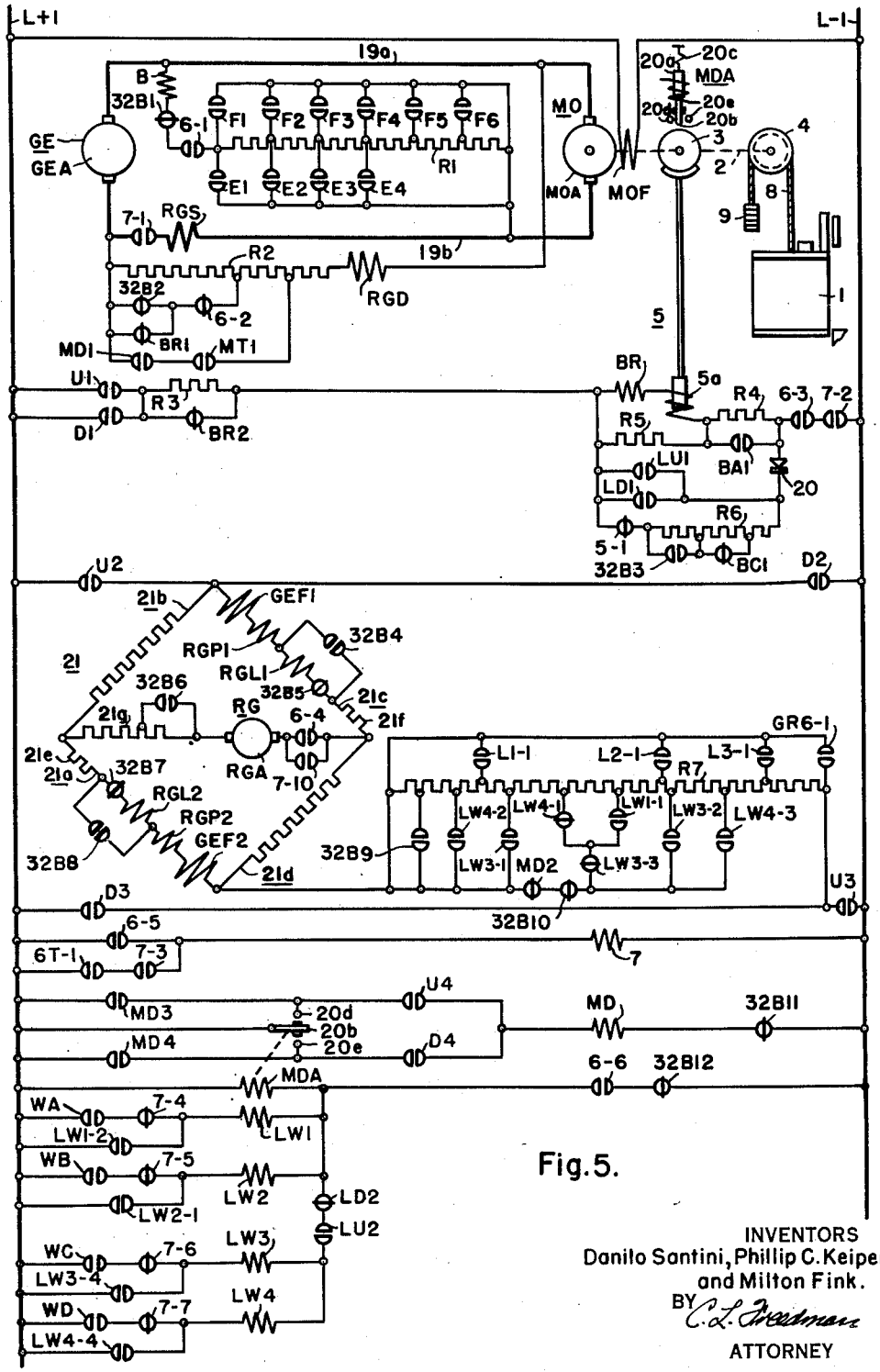
Fig. 5 is a schematic view in straight line form, showing control circuits suitable for the elevator system of Fig. 1.
Figure 5A:
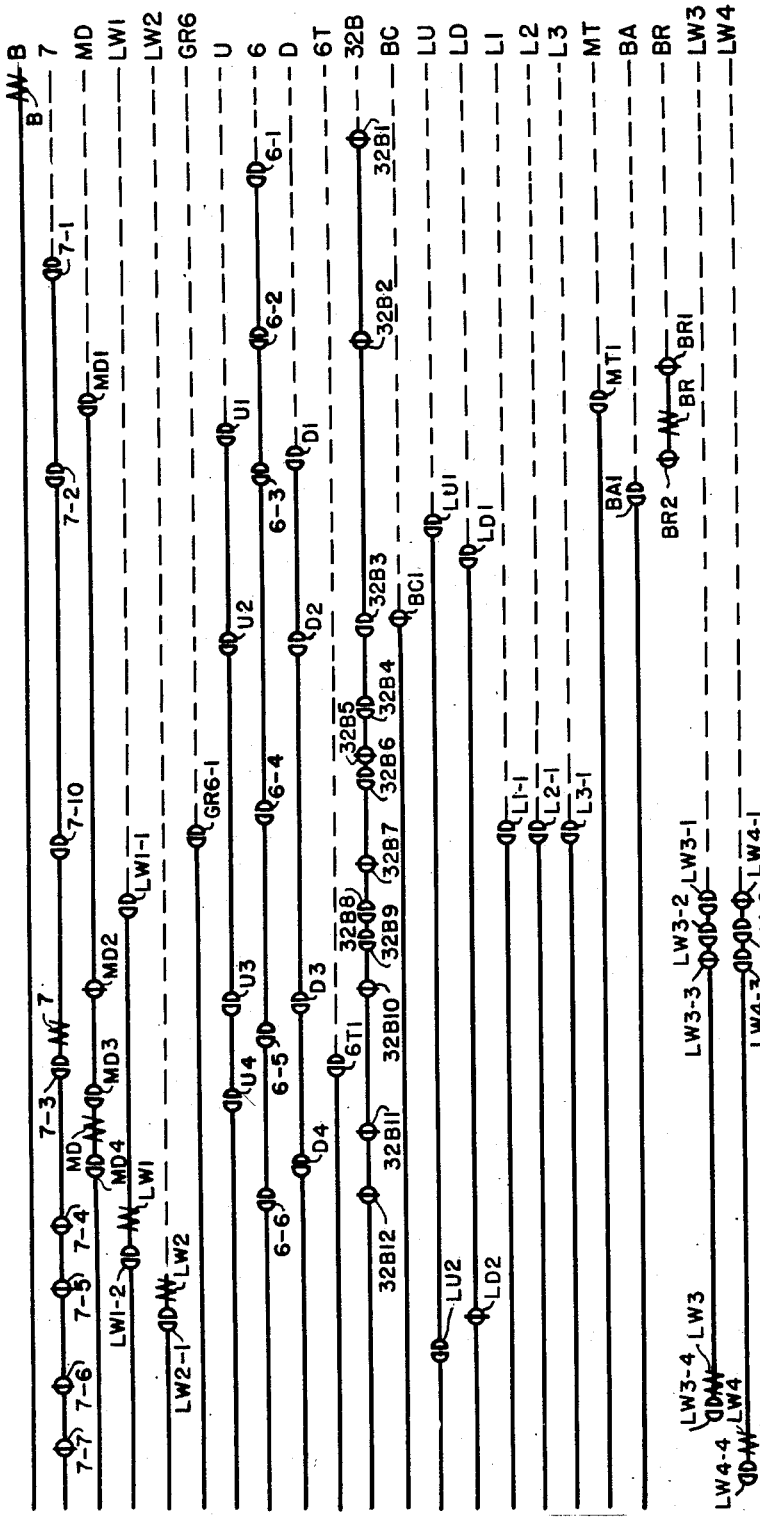
Fig. 5A is a schematic view showing various relays, switches and contactors employed in the circuits of Fig. 5. If

In Fig. 5, the motor MO is connected for energization in a variable-voltage circuit. Energization for the motor MO is supplied by a main generator GE. This generator is similar to main generators heretofore employed in variable voltage drives except for the provision of two separate and similar generator field windings GEF1 and GEF2.

The energization of the field windings of the main generator GE is controlled in part by a regulating generator RG which has a number of field windings. Thus, the regulating generator has pattern field windings RGP1 and RGP2 which are similar to each other. In addition, the regulating generator has two auxiliary pattern field windings RGL1 and RGL2 which are employed to boost the excitation of the regulating generator derived from the main pattern field windings during certain leveling operations. When the main pattern field windings RGP1 and RGP2 alone are effective, the regulating generator has a first volts-per-ampere characteristic. In other words, a first ratio is provided between the volts output from the regulating generator armature RGA and the current passing through the pattern field windings. When the main and auxiliary pattern field windings all are effective, a second volts-per-ampere characteristic is obtained. The ratio in the latter case is substantially greater than the ratio obtained when the main pattern field windings alone are effective.

The regulating generator has a series field winding RGS which increases the field excitation of the regulating generator to compensate for the voltage drop due to the resistance of the armature MOA of the driving motor MO. Finally, the regulating generator has a differential field winding RGD which is energized to provide a field excitation which is in opposition to the field excitation of the pattern field windings.

Energization for various circuits employed in Fig. 5 is derived from a suitable source of direct current represented by two buses L+1 and L—1. The field winding MOF for the motor MO is connected directly across the buses L+1 and L—1.

The armature MOA of the driving motor and the armature GEA of the main generator GE are connected in a loop circuit by means of two conductors 19a and 19b. The loop circuit may be interrupted by the opening of the make contacts 1—1 of a running contactor. The series field winding RGS of the regulating generator is included in the loop circuit in series with the armatures MOA and GEA.

Figure 6:
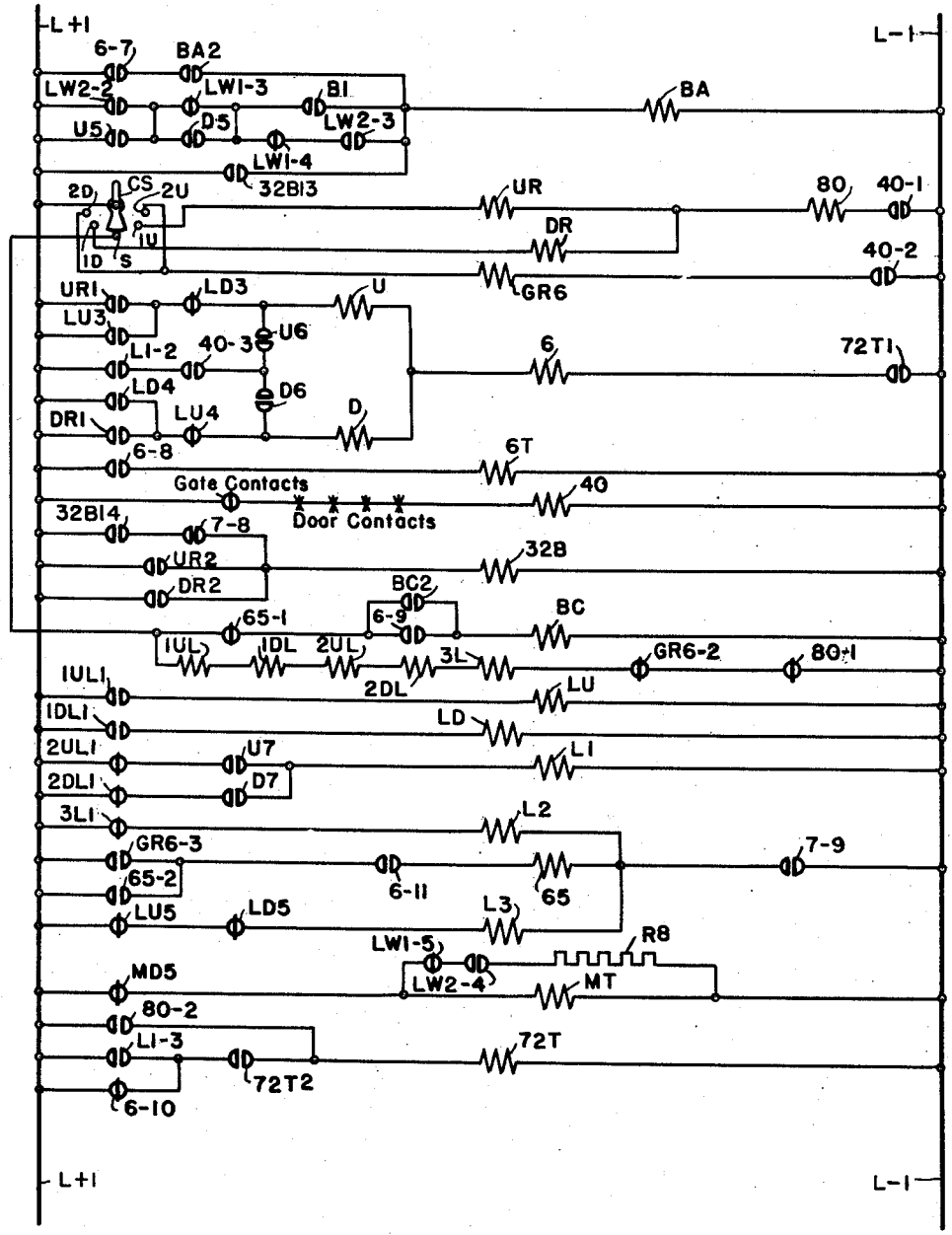
Fig. 6 is a schematic view in straight line form, showing further control circuits suitable for the system of Fig. 1.
Figure 6A:
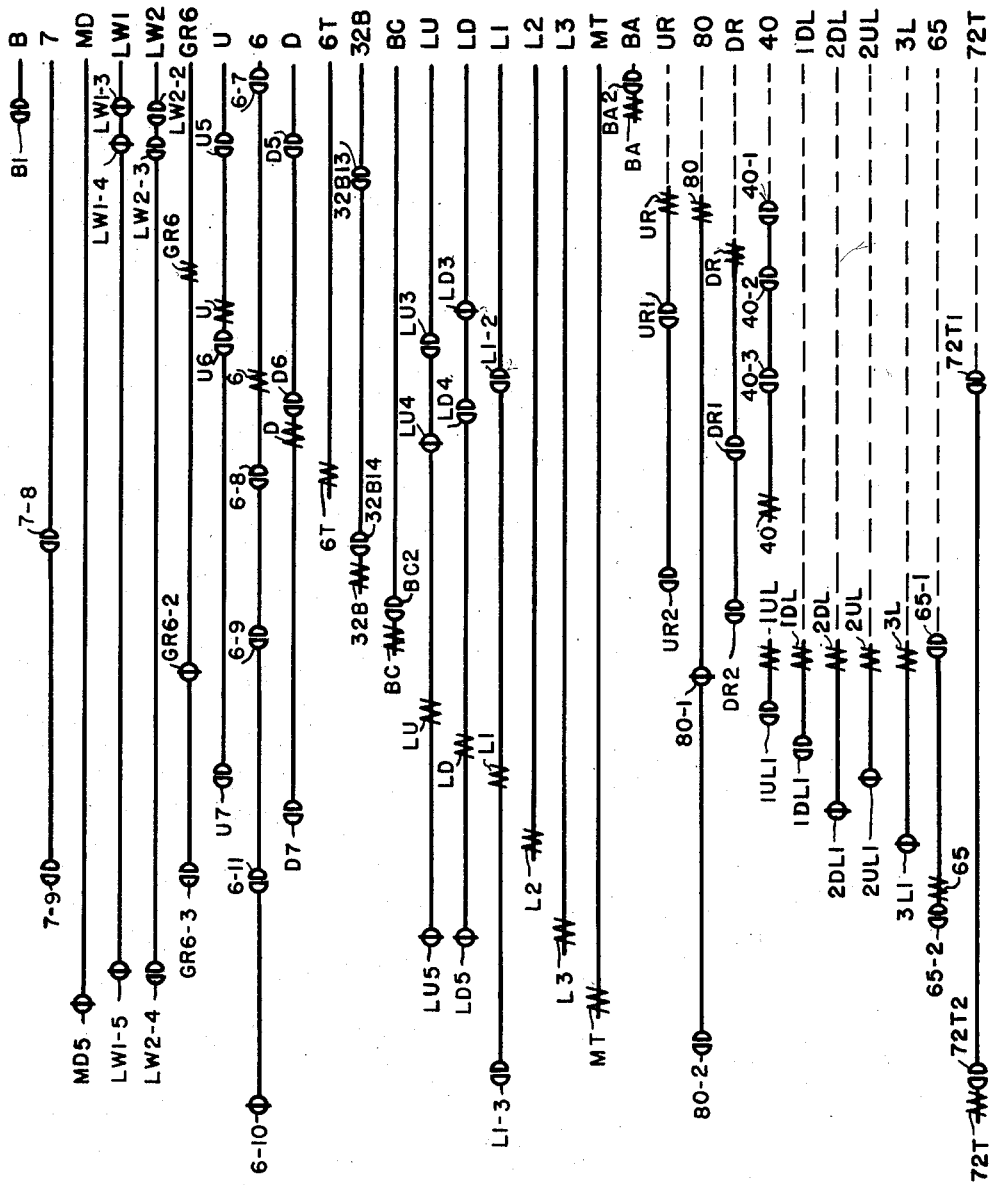
Fig. 6A is a schematic view of relays, switches and contactors employed in the circuits of Fig. 6. If

When the elevator car is to be leveled for the purpose of compensating for cable stretch or contraction, a loop-voltage relay B is connected between the conductors 19a and 19b through the resistor R1, make contacts 6—1 of a running relay 6 (shown in Fig. 6) and break contacts 32B1 of a cable-stretch relay 32B (shown in Fig. 6).

It will be recalled that the resistor R1 has a resistance value which depends on the loading of the elevator car. The resistor has the minimum effective resistance value when the loading of the elevator car is in the balanced range. For this effective resistance value, a low voltage output of the generator GE suffices to pick up the loop-voltage relay B. The effective resistance value of the resistor R1 increases as the loading departs from the balanced range, either towards full loading or zero loading of the elevator car. As the effective resistance value of the resistor R1 increases, the voltage required to pick up the relay B also increases. The purpose of the relay B is to permit a release of the elevator brake when the driving motor is to level the elevator car in the hauling direction only after the generator GE has a voltage output sufficient to support the hauling load.

It will be understood that the armature of the direct-current generator GE and the armature of the direct-current regulating generator RG are rotated in any suitable manner at a constant rate of rotation. Thus, each of the generators may be driven at a constant rate by an electric motor (not shown).

When the elevator car is to be leveled for the purpose of compensating for cable stretch or contraction, the field excitation of the main generator GE is modified as soon as the driving motor MO starts to rotate. Detection of rotation of the driving motor is effected by means of a motion detector. This motion detector may include a magnetic armature 20a which has a pin 20b projecting from one end thereof towards the brake drum 3. Normally, the pin 20b is biased away from the drum 3 by means of a spring 20c. The pin 20b is advanced into engagement with the drum 3 by means of energization of a coil MDA. When the coil is energized, it urges the armature 20a towards the brake drum.

Normally the pin 20b constitutes an electrical contact which is biased towards a position midway between two spaced contacts 20d and 20e. The pin is allowed to move with the drum 3 sufficiently to effect an engagement with either of these contacts, depending on the motion of the drum. Since the spacing between the pin and the contacts is extremely small, the pin operates to complete an electrical circuit as soon as the drum starts to rotate.

When the generator GE initially is excited, the voltage across the terminals thereof starts to increase. The increasing voltage increases the energization of the differential field RGD in a direction which opposes further increase in the excitation supplied to the generator GE. The rate at which the differential field windings RGD opposes such increase in the excitation of the generator GE, may be controlled by controlling the effective resistance value of a resistor R2 which is connected in series with the differential field winding across the terminals of the armature GEA. During normal running of the elevator car between landings, the entire resistance of the resistor R2 may be employed. As the elevator car stops at a landing, a portion of the resistor may be shunted through the break contacts 6—2 of the running relay and break contacts 32B-2 or BR-1. Such shunting of a portion of the resistor R2 increases the rate on which the excitation of the generator GE is decreased.

When the elevator car is to level for the purpose of compensating for cable stretch or contraction, the excitation of the generator GE may be increased to a high value for the purpose of forcing a rapid build up of voltage output therefrom. However, as soon as the elevator car starts to move, a substantial portion of the resistor R2 is shunted through make contacts MD1 of a motion detector relay and make contacts MT1 of a timing relay. The resulting increase in energization of the differential field winding RGD is employed for reducing the voltage output of the generator GE. This reduction is continued for a time dependent on the loading of the elevator car as determined by the timing relay MT (shown in Fig. 6). Thus, the contacts MT1 of the timing relay remain closed longer for a lightly loaded elevator or car in order to force the generator voltage output to a lower value.

The brake 5 is of the type which is biased into braking position by means of a spring (not shown). The brake is released by means of energization of a brake-releasing coil 5a. The brake release circuit is as follows:

L—1, U1 or D1, BR2, BR, 5a, BA1, 6—3, 7—2, L—1

The energization of the brake coil 5a also energizes the brake-released relay BR. This relay opens its break contacts BR2 to insert a resistor R3, in the brake-release circuit, thereby reducing the current through the circuit to a value merely sufficient to hold the brake 5 in its released position.

When the elevator car is to be leveled in an overhauling direction, a resistor R4 is inserted in the brake-release circuit in response to opening of the make contacts BA1 of a brake relay. Releveling under these circumstances is effected with the brake partially applied. Such partial application of the brake results in more stability during the leveling of the elevator car in the overhauling direction.

A brake discharge resistor R5 is connected across the brake coil 5a. This resistor has a high resistance value and would result in the fast and hard application of the brake if it were employed alone.

The rate of dissipation of energy stored in the brake coil 5a is controlled further by means of make contacts LU1 or LD1 of up and down leveling relays. When either of these sets of contacts is closed, a low resistance circuit is established across the brake coil 5a through a rectifier 20. Consequently, the energy stored in the brake coil discharges at a very slow rate and the brake remains picked up for a substantial time after the brake-release circuit is open.

The rectifier 20 is very desirable in the brake discharge circuit. It prevents flow of energy between the buses therethrough. At the same time, it establishes a low resistance path for discharge currents from the brake coil. It eliminates the requirement for contacts which may introduce a variable contact resistance and it eliminates the arcing problems introduced by such contacts.

Further control of the discharge rate of energy stored in the rate coil 5a is provided by means of a resistor R6 which is connected across the coil 5a through the rectifier 20 and through contacts 5—1. The contacts 5—1 are open in the fully released position of the brake 5. However, they close immediately after the brake 5 starts to set and introduce all or a portion of a resistor R6 in the discharge circuit of the brake coil. The amount of the resistor R6 which is effective in the brake discharge circuit depends on the condition of the break contacts BC1 of a brake modifier relay and the make contacts 32B3 of the cable stretch relay. It will be understood that the greater the value of resistance in the discharge circuit for the brake coil, the faster will be the application or setting of the brake.

It will be noted that a number of different brake operations are provided by the invention. These operations may be summarized as follows:

When the brake release circuit is energized, the brake is promptly and completely released if the contacts BA1 are closed. Such release takes place if the elevator car is conditioned for a floor-to-floor run or if the elevator car is to level in the hauling direction. If the elevator car is to level in an overhauling direction, the contacts BA1 are open and the elevator brake is only partially released. Leveling then takes place while the elevator brake is partially applied.

Four different brake applications are provided by the circuits of Fig. 5. If the elevator car is approaching a floor for a normal landing, the contacts BC1 and 32B3 are closed and only a small proportion of the resistor R6 is effective in the discharge circuit for the coil 5a. Consequently, the elevator brake is applied at a comparatively slow rate to provide a soft braking action.

Should the elevator car overrun the floor during the landing operation, one of the sets of contacts LU1 or LD1 closes to establish a shunt across the brake coil 5a. This delays the completion of the brake setting for a time sufficient to permit reestablishment of the brake-release circuit before the brake is completely set. The maintenance of the brake in a released condition facilitates the rapid and smooth reversal of the elevator car for the ensuing leveling operation.

Following the overrun of the floor, the elevator car is leveled or returned towards a position in registration with the desired floor. During this return to the floor, the contacts BC1 open to introduce a greater proportion of the resistor R6 in the discharge circuit for the brake coil 5a. This means that the elevator brake sets more rapidly and prevents over-travel of the elevator car as it levels into the desired position.

If the elevator car is being leveled to compensate for cable stretch or contraction, both of the sets of contacts 32B3 and BC1 are open to introduce the entire resistor R6 into the discharge circuit for the coil 5a. This results in a fast and hard braking action to stop the elevator car accurately at the completion of the leveling operation.

In order to facilitate rapid and accurate changes in the speed of the elevator car, the regulating generator RG is arranged in a "split" Wheatstone bridge 21 which has four arms 21a, 21b, 21c and 21d connected successively in a ring. The arm 21a includes in series the generator field winding GEF2, the regulating generator main pattern field winding RGP2, the regulating generator auxiliary pattern field winding RGL2, break contacts 32B7 and a resistor 21e. Make contacts 32B8 are connected to shunt the auxiliary regulating generator field winding RGL2 and the break contacts 32B7.

In an analogous manner, the arm 21c of the bridge includes in series the generator field winding GEF1, the regulating generator main pattern field winding RGP1, the regulating generator auxiliary pattern field winding RGL1, the break contacts 32B5 and a resistor 21f. Make contacts 32B4 are arranged to shunt the auxiliary field winding RGL1 and the break contacts 32B5. As shown in Fig. 5, the remaining arms of the bridge may comprise resistors.

The armature RGA of the regulating generator is connected across one diagonal of the bridge through make contacts 6—4 of the running relay or make contacts 7—10 of the running contactor and a resistor 21g. A portion of the resistor 21g may be shunted by make contacts 32B6 of the cable-stretch relay.

The remaining diagonal of the bridge is connected across the buses L+1 and L—1 through a resistor R7 and a reversing switch. The reversing switch includes make contacts U2 and U3 of the up switch. These contacts are closed when the system is conditioned for up travel. The reversing switch also includes make contacts D2 and D3 which are closed when the elevator system is conditioned for down travel.

When the bridge is connected across the buses, current flows through the field windings connected in the arms of the bridge circuit. Certain of these windings excite the regulating generator and this develops a voltage across the armature RGA which produces currents increasing the excitation of the field windings. The auxiliary pattern field windings RGL1 and RGL2 are connected in the bridge circuit only when the elevator car is being leveled to compensate for cable stretch or contraction. When the auxiliary pattern field windings are connected for energization, the contacts 32B6 may be open to introduce the entire resistor 21g in series with the armature RGA.

The effective value of the resistance introduced in series with the bridge by the resistor R7 controls to a substantial extent the excitation of the generators. It will be noted by inspection of Fig. 5 that make contacts L1, L2, L3 and GR6-1 are connected to taps on the resistor R7 for the purpose of shunting portions of the resistor. These contacts are opened to control the retardation of the elevator car.

Furthermore, it will be noted that a plurality of make contacts LW1—1, LW3—1, LW3—2, LW4—2 and LW4—3 and break contacts LW4—1, and LW3-3 of the load zone relays are employed for shunting portions of the resistor R7. Further control of the effective resistance of the resistor R7 is provided by make contacts 32B9 and break contacts 32B10 of the cable stretch relay and by break contacts MD2 of the motion detector relay.

A running contactor 7 is connected for energization while the elevator system is in running condition. This contactor has a self-holding circuit which is completed through its make contacts 7—3 and make contacts 6T1 of a timing relay.

The motion detector controls the energization of a motion detector relay MD. When the contacts 20b and 20d are in engagement, when the make contacts U4 of the up switch are closed and when the break contacts 32B11 of the cable-stretch relay are closed, the motion detector relay MD is energized and closes its make contacts MD3 to establish a holding circuit around the contacts 20b and 20d. Also when the contacts 20b and 20e are in engagement, when the make contacts D4 of the down switch are closed and when the contacts 32B11 are closed, the motion detector relay MD is energized and closes its make contacts MD4 to establish a holding circuit around the contacts 20b and 20e.

The motion detector advancer MDA is energized through make contacts 6—6 of the running relay and break contacts 32B12 of the cable-stretch relay.

Energization of the load zone relays LW1, LW2, LW3 and LW4 requires closure of the contacts 6—6 and 32B12. In addition, for energizing the load zone relay LW1, the contacts WA and the break-contacts 7—4 must be closed. To permit pickup of the relay LW1 after closure of the contacts 6—6 and before opening of the contacts 7—4, the running contactor 7 may have a slight delay in pickup sufficient to permit the prior pickup of the relay LW1. When the relay LW1 picks up, it establishes a self-holding circuit around the contacts WA and 7—4.

The load zone relay LW2 is associated in an analogous manner with the contacts WB. The load zone relays LW3 and LW4 are associated in analogous manners with the contacts WC and WD, respectively, but for energization additionally require closure of the break contacts LD2 and the make contacts LU2, of the down and up level relays.

It will be recalled that the contacts WA to WD are located in the load weigher. To review briefly the operation of these contacts, if the car is fully loaded, the sets of contacts WA and WB both are open and the load zone relays LW1 and LW2 are deenergized. In addition, the sets of contacts WC and WD both are closed, and permit energization of the load zone relays LW3 and LW4.

Assume next that the car load is reduced until it reaches a value at which with the brake released, the circulating loop current and friction just support the car. At this value of the load, the contacts WB in the load weigher close and permit energization of the load zone relay LW2.

Assume next that the load is further reduced until it reaches a value at which when the brake is released, the car will start to move up. At this value of the load, the contacts WA in the load weigher close and permit energization of the load zone relay LW1.

APPARATUS IN FIGURE 6

It will be recalled that the brake relay BA is employed for distinguishing between an overhauling and a hauling load during a leveling operation. This relay is controlled by combinations of contacts of the load zone relays LW1 and LW2, the loop voltage relay B, the up switch U, the down switch D and the cable-stretch relay 32B. The contacts of these relays are clearly illustrated in Fig. 6.

When the relay BA is energized, the elevator brake may be rapidly and completely released. The conditions under which the relay BA is energized may be set forth as follows:

A. Assume first that the elevator car is fully loaded. Under this condition the contacts WA and WB (Fig. 4) of the load weigher are open and both of the load zone relays LW1 (Fig. 5) and LW2 are deenergized.

1. If the elevator car is to level in an up direction, the load presented to the elevator driving motor is a hauling load. When the main generator has built up a voltage sufficient to support the elevator car, the loop voltage relay B (Fig. 5) is energized sufficiently to close its contacts B1 (Fig. 6). This completes the following energizing circuit for the brake relay BA:

L+1, U5, LW1—3, B1, BA, L—1

Upon energization of the relay BA, contacts BA1 (Fig. 5) close to permit complete release of the elevator brake. It may be pointed out that the elevator brake coil 5a may be partially energized through the resistor R4 prior to closure of the contacts BA1. However, such partial release of the elevator brake is not sufficient to permit dropping of the elevator car.

2. If the elevator car is to be leveled down while fully loaded, an overhauling load is presented to the driving motor. Since the contacts LW2—2 and U5 (Fig. 6) are open, the brake relay BA remains deenergized and the car is leveled with the elevator brake partially applied.

B. In the balanced load range, contacts WA (Fig. 4) of the load weigher are open and contacts WB are closed. The relay LW1 (Fig. 5) is deenergized and it is assumed that the load zone relay LW2 is energized. By inspection of Fig. 6, it will be observed that the brake relay BA is promptly energized for leveling either in the up or the down direction. Consequently, the brake is fully released and the car is permitted to move as soon as the voltage applied by the main generator is sufficient to produce such motion.

C. If the elevator car is lightly loaded or empty, the sets of contacts WA and WB (Fig. 4) of the load weigher are both closed and it is assumed that under these conditions the load zone relays LW1 and LW2 (Fig. 5) are energized.

1. If the elevator car is to be leveled in an up direction, the relay BA (Fig. 6) remains deenergized. The sets of contacts LW1—3 and D5 both are open. Under such circumstances, the driving motor has an overhauling load and leveling of the elevator car is effected with a partially applied elevator brake.

2. If the lightly loaded or empty elevator car is to be leveled in a down direction, and if the loop voltage relay B (Fig. 5) has been energized sufficiently to pick up, the following circuit is established:

L+1, LW2—2, D5, B1, BA, L—1

The energization of the relay BA results in full release of the elevator brake and the driving motor picks up the hauling load to level the elevator car.

It may be well to state at this time that the relay BA is energized while the elevator car is conditioned for a floor-to-floor run and while the car is leveling to correct for overrun. Such energization for the relay BA is provided through the contacts 32B13 of the cable stretch relay.

Inasmuch as the elevator system is assumed to be designed for car switch operation, a car switch CS is illustrated in Fig. 6. When the car switch is rotated in a counterclockwise direction as viewed in Fig. 6, it engages the contact 1U to complete an energizing circuit for the up relay UR through the auxiliary running relay 80 and make contacts 40—1 of the door relay. If the rotation of the car switch is continued, it also engages the full speed contact 2U to energize the full speed relay GR6 through the make contacts 40—2 of the door relay.

When the car switch is rotated in a clockwise direction as viewed in Fig. 6, it engages the contact ID to complete an energizing circuit for the down relay DR through the auxiliary running relay 80 and the make contacts 40—I of the door relay. Continued motion of the car switch in the clockwise direction brings it into engagement with the contact 2D to establish an energizing circuit for the full speed relay GR6 through the make contact 40—2 of the door relay.

When the car switch CS is in its neutral position, as illustrated in Fig. 6, it completes an energization circuit for the coils of the inductor relays through break contacts GR6—2 of the full-speed relay and break contacts 80—I of the auxiliary running relay.

The up switch U, the down switch D and the running relay 6 can be energized only if the make contacts 72T1 of a timing relay are closed. When the car switch CS is operated to energize the up relay UR, the resulting closure of the make contacts UR1 establishes the following circuit:

L+1, UR1, LD3, U, 6, 72T1, L—1

Assuming that the make contacts L1—2 of the third landing relay and 40—3 of the door relay are closed, the energized up switch U closes its contacts U6 to establish a self-holding circuit around the contacts UR1 and LD3. Deenergization of the third landing relay would result in opening of the contacts L1—2 to deenergize the up switch.

For a leveling operation, the up switch may be energized by closure of the contacts LU3 of the up leveling relay. Closure of the make contacts LU3 would be accompanied by opening of break contacts LU4 to prevent energization of the down switch D.

The down switch D may be energized in an analogous manner. For example, if the car switch CS is operated to energize the down relay DR, the resulting closure of the make contacts DR1 establishes the following circuit:

L+1, DR1, LU4, D, 6, 72T1, L—1

The resulting closure of the make contacts D6 establishes a self-holding circuit for the down switch D which is completed through the contacts L1—2 and 40—3.

For a down leveling operation, closure of the contacts LD4 of the down leveling relay would establish an energizing circuit for the down switch D and the running relay 6. The closure of the make contacts LD4 would be accompanied by opening of the break contacts LD3 to prevent energization of the up switch.

The timing relay 6T is energized in response to energization of the running relay 6 which closes its make contacts 6—8. The timing relay 6T may have a time delay in dropout of the order of two seconds. It is employed for preventing prompt dropout of the running contactor 7 (Fig. 5) when the running relay 6 is deenergized.

The door relay 40 (Fig. 6) is a safety device which is energized through car gate contacts and hoistway door contacts only if the car gate and the hoistway doors associated with the elevator car are all closed. The gate contacts and the door contacts are responsive to the positions of the gate and doors and are illustrated in Fig. 6. Such a safety circuit is well understood in the art.

The cable-stretch relay 32B is energized when either the up relay or the down relay UR or DR is energized. Upon energization, the cable-stretch relay 32B closes its make contact 32B14 to establish a self-holding circuit which is completed through the make contacts 7—8 of the running contactor. As long as the elevator car continues to run between floors, and for an additional time determined by the dropout of the running contactor 7, the cable-stretch relay 32B remains energized. As long as the relay 32B is energized, it prevents energization of the loop voltage relay B (Fig. 5). It prevents the break contacts 32B2 from completing a shunt around the portion of the resistor R2 and it maintains the make contacts 32B3 closed to provide a comparatively soft brake operation. In addition, the energized cable-stretch relay 32B prevents energization of the auxiliary pattern field windings RGL1 and RGL2. A portion of the resistor 21g is shunted by the closed contacts 32B6, and similarly a portion of the resistor R7 is shunted by the contacts 32B9. The break contacts 32B10s remain open to segregate contacts of the load zone relays associated with the resistor R7. The break contacts 32B11 remain open to prevent energization of the motion detector relay MD. The break contacts 32B12 remain open to prevent energization of the motion detector advancer MDA and to prevent energization of the load zone relays LW1 to LW4. Finally, the make contacts 32B13 (Fig. 6) remain closed to energize the brake relay BA. Consequently, the brake 5 (Fig. 5) is either fully applied or fully released.

When the relay 32B is deenergized, the system is conditioned for fast and efficient leveling of the elevator car to compensate for cable stretch or contraction.

The brake modifier relay BC can be energized only when the car switch CS is in its neutral or stopping position. The circuit for energizing the relay BC is completed through the break contacts 65—1 of a brake regulator relay and the make contacts 6—9 of the running relay. When the relay BC is energized, it opens its break contacts BC1 (Fig. 5) to modify the effective resistance value of the resistor R6. In addition, make contacts BC2 (Fig. 6) are closed to establish a holding circuit around the contacts 6—9.

The up and down leveling relays LU and LD are energized respectively by closure of the make contacts IUL1 and IDL1 of the inductor relays IUL and IDL.

The third landing relay L1 is energized when make contacts U7 of the up switch and break contacts 2UL1 of the inductor relay 2UL are closed. Alternatively, the relay L1 may be energized when the make contacts D7 of the down switch and the break contacts 2DL1 of the inductor relay 2DL are closed.

The second landing relay L2, the brake regulator relay 65 and the leveling field control relay L3 can be energized only if the make contacts 7—9 of the running contactor are closed. The energizing circuit of the second landing relay L2 is completed through break contacts 3L1 of the inductor relay 3L. The energizing circuit for the brake regulator relay 65 is completed through the make contacts of the full speed relay GR6 and make contacts 6—11 of the running relay. When energized, the brake regulator relay 65 closes its make contacts 65—2 to establish a holding circuit around the contacts GR6—3.

An energizing circuit for the leveling-field-control relay L3 is completed through the break contacts LD5 and LU5 of the up and down leveling relays.

It will be recalled that the timing relay MT is employed for determining the length of time during which a portion of the resistor R2 (Fig. 5) is shunted. As shown in Fig. 6, the timing relay MT is energized through break contacts MD5 of the motion detector relay. As soon as the motion detector detects a movement of the driving motor, the contacts MD5 are opened to start a timing out operation of the relay MT. (This assumes that the break contacts 32B11 (Fig. 5) are closed.) The timing relay has a delay in dropout which depends on the condition of the break contacts LW1—5 and the make contacts LW2—4. These contacts are connected in series with a resistor R8 across the timing relay MT. When the resistor R8 is connected across the relay, the timing relay may have a delay in dropout of the order of 0.8 second. When the resistor R8 is disconnected, the timing relay may have a delay in dropout of the order of 0.2 second.

When the load on the elevator car is in the balanced range, a minimum generator voltage is required for completing the leveling of the elevator car once a leveling operation has started. Under these circumstances, the load zone relay LW1 is deenergized and the load zone relay LW2 is energized and picked up. This means that the resistor R8 in Fig. 6 is connected across the timing relay MT and the timing relay has its maximum delay in dropout. For this reason, the differential field winding RGD of Fig. 5 is permitted to force the main generator voltage to a comparatively low value.

In the full load zone, the load zone relay LW2 is deenergized and its make contacts LW2—4 are open. In the light load zone, the relay LW1 is energized and the break contacts LW1—5 are open. In either case, the resistor R8 is not connected across the timing relay MT. Consequently, the timing relay has a comparatively short dropout time and the contacts MT1 of Fig. 5 open while the main generator GE is applying a substantial voltage to the motor MO.

The timing relay 72T is connected for energization when the auxiliary running relay is energized to close its make contacts 80—2. When energized, the timing relay closes its make contacts 72T2 to establish a self-holding circuit which is completed either through the make contacts L1—3 of the third landing relay or through the break contacts 6—10 of the running relay 6. The timing relay 72T may have a time delay in dropout of the order of 6 seconds.

*Operation A.—Fully-loaded car runs from the third to the second landing*

The operation of various portions of the elevator system have been discussed to some extent in the discussions of the various figures. However, it is believed that an understanding of the invention will be facilitated by a review of certain typical operations of the elevator system. For the first operation, it is assumed that the elevator car is at the third landing and that the elevator car doors are open. In addition, it is assumed that the elevator car is fully loaded. The full load rating of the elevator car may be of the order of 10,000 pounds.

Inasmuch as the elevator car is standing at the third landing, the car switch CS (Fig. 6) is in its neutral or stopping position. Since the break contacts GR6—2 of the full speed relay and the break contacts 80—1 of the auxiliary running relay are closed, it follows that the following circuit is established:

L+1, CS, S, 1UL, 1DL, 2UL,
2DL, 3L, GR6—2, 80—1, L—1

Consequently, as long as the elevator car remains at the third landing with its doors open, the coils of the inductor relays are energized, and are available for maintaining the elevator car in register with the third landing.

When the elevator attendant closes the car doors and gates, the door relay 40 is energized and closes its make contacts 40—1, 40—2, 40—3. Such contact closures prepare the system for subsequent operations.

The car attendant then rotates the car switch CS in a clockwise direction as viewed in Fig. 6 to start the elevator car in a down direction. When the car switch engages the contact 1D, the following circuit is established:

L+1, CS, 1D, DR, 80, 40—1, L—1

The resultant energization of the auxiliary running relay 80 is effective for opening the break contacts 80—1 to deenergize the coils of the inductor relays. In addition, the make contacts 80—2 close to energize the timing relay 72T. This timing relay closes its make contacts 72T—1 to prepare the running relay 6 and the down switch D for subsequent energization. Also, the timing relay closes its make contacts 72T2 to complete a holding circuit through the contacts 72T2 and the break contacts 6—10 of the running relay.

The energization of the down relay DR resulting from operation of the car switch completes the following circuit:

L+1, DR1, LU4, D, 6, 72T1, L—1

In addition, the down relay closes its make contacts DR2 to energize the cable-stretch relay 32B.

The energization of the down switch D resulting from closure of the make contacts DR1 results in closure of the make contacts D1 to complete the following brake circuit (Fig. 5):

L+1, D1, BR2, BR, 5a, R4, 6—3, 7—2, L—1

The make contacts 6—3 and 7—2 are closed for reasons which will be set forth below. Since the resistor R4 is included in the energizing circuit for the brake coil 5a, the brake is only partially released and continues to hold the elevator car at the third landing.

The make contact D2 and D3 close to connect the bridge 21 for energization through the resistor R7 with proper polarity for down travel of the elevator car.

The make contacts D4 close to prepare the motion detector relay MD for subsequent energization.

Closure of the make contacts D5 (Fig. 6) has no immediate effect on system operation. The energization of the brake relay BA at this time is controlled by closure of the make contacts 32B13 of the cable-stretch relay. Since these contacts are now closed, it follows that the relay BA is energized and closes its make contacts BA1 (Fig. 5) to energize the brake coil 5a sufficiently to fully release the brake. Such energization of the brake also energizes the brake-released relay BR to open its break contacts BR1 and BR2. The opening of the break contacts BR2 inserts the resistor R3 in the brake circuit to reduce the amount of current flowing therethrough.

The make contacts D6 close to establish a holding circuit for the relays D and 6 through the make contacts 40—3 as soon as the make contacts L1—2 are closed. Closure of the make contacts D7 completes the following energizing circuit for the third landing relays:

L+1, 2DL1, D7, L1, L—1

Referring now to the energized running relay 6, it will be noted that the running relay closes its make contacts 6—1 (Fig. 5) to prepare the loop voltage relay B for energization. However, inasmuch as the contacts 32B1 are now open, the relay B cannot be energized at this time.

The running relay also opens its break contacts 6—2 to make certain that the entire resistor R2 is effective for limiting current flowing through the differential field winding RGD.

The make contacts 6—3 are closed by energization of the running relay 6. As previously explained, closure of these contacts is necessary for energization of the brake coil.

The closure of the make contacts 6—4 of the running relay connects the armature RGA of the regulating generator across a diagonal of the bridge 21 and the armature now is effective for supplying current to the field windings of the bridge.

Upon energization of the running relay, the make contacts 6—5 close to energize the running contactor 37.

The make contacts 6—6 close, but have no immediate effect on the operation of the system.

The make contacts 6—7 (Fig. 6) close to complete with the make contacts BA2 a holding circuit for the brake relay BA. The closure of the make contacts 6—8 completes an energizing circuit for the timing relay 6T. The make contacts 6—9 also close, but have no immediate effect on the operation of the system.

The break contacts 6—10 open to prevent the establishment therethrough of a holding circuit for the timing relay 72T. Finally, the break contacts 6—11 close to prepare the relay 65 for subsequent energization.

As previously pointed out, the cable-stretch relay 32B was energized as a result of closure of the make contacts DR2. The relay 32B, upon energization, opens its break contacts 32B1 (Fig. 5) to prevent energization of the loop voltage relay B. In addition, the break contacts 32B2 open, but such opening has no immediate effect on the operation of the system.

Closure of the make contacts 32B3 shunts a portion of the resistor R6, but such shunting has no immediate effect on the operation of the system.

The energization of the relay 32B also results in closure of the make contacts 32B4 and 32B8, together with openings of the break contacts 32B5 and 32B7. Such contact operation removes the auxiliary pattern field winding RGL1 and RGL2 of the regulating generator from the bridge.

Closure of the make contacts 32B6 shunts a portion of the resistor 21g and increases the effectiveness of the output of the regulating generator.

The closure of the make contact 32B9 and the opening of the break contacts 32B10 of the cable-stretch relay, modifies the tap connections of the resistor R7. However, for reasons which will be pointed out below, such modification has substantially no effect on the operation of the system at this time.

Because of the opening of the break contacts 32B11, the motion detector relay MD can not be energized. Furthermore, because of its opening of the break contact 32B12, the motion detector advancer MDA and the load zone relays LW1 to LW4 cannot be energized.

As previously pointed out, the closure of the make contacts 32B13 (Fig 6) resulted in the energization of the brake relay BA. The make contacts 32B14 close as a result of energization of the relay 32B. These contacts 32B14 with the make contacts 7—8 of the running contactor establish a holding circuit for the relay 32B.

Contact changes resulting from energization of the third landing relay L1 now will be considered. The make contacts L1-1 (Fig. 5) close to shunt a portion of the resistor R7. Consequently, closure of these contacts increases the energization of the field windings of the main generator GE. While the contacts L1-1 are closed, the contacts 32B9 have no effect on the operation of the system.

In addition, the make contacts L1-2 (Fig. 6) close to establish a holding circuit for the relays D and 6 which includes the make contacts L1-2, 40—3 and D6.

Finally, the make contacts L1-3 close to complete with the make contacts 72T2 of the timing relay, a holding circuit for the timing relay.

Referring again to Fig. 5, it will be noted that energization of the running contactor results in closure of the make contacts 7—1 to complete the loop circuit for the armatures GEA and MOA.

Also, make contacts 7—2 close. It will be recalled that closure of these contacts is a prerequisite for energization of the brake coil 5a.

The closure of the make contacts 7—3 complete with the make contacts 6T1, a holding circuit for the running contactor 7. Inasmuch as the timing relay 6T (Fig. 6) has a time delay on dropout, it follows that the running contactor 7 remains energized after the deenergization of the running relay 6 for a time corresponding to the dropout time of the timing relay 6T.

Upon energization, the running contactor opens its break contacts 7—4 to 7—7 (Fig. 5). If the load zone relays LW1 to LW4 are not energized prior to opening of the brake contacts 7—4 to 7—7, it follows that they can not thereafter be energized until such break contacts reclose.

Closure of the make contacts 7—8 (Fig. 6) completes with the make contacts 32B14, a holding circuit for the cable-stretch relay 32B.

Inasmuch as the variable-voltage loop is complete, the elevator brake is released and the field windings of the main generator are excited with proper polarity for down travel of the elevator car, the elevator car starts down from the third landing. It may be pointed out that when the brake 5 (Fig. 5) was released, the contacts 5—1 opened, but such opening had no immediate effect on the operation of the system.

When the running contactor was energized, the make contacts 7—9 closed. Closure of the make contacts completes the following two circuits:

L+1, 3L1, L2, 7—9, L—1 and

L+1, LU5, LD5, L3, 7—9, L—1

The energization of the second landing relay L2 and of the leveling-field-control relay L3 results in closure of the make contacts L2-1 and L3-1 (Fig. 5) to shunt portions of the resistor R7. Such shunting results in substantial energization of the main field windings of the main generator GE and produces a substantial car speed which may be of the order of 160 feet per minute.

If a higher car speed is desired, the car attendant may rotate the car switch CS (Fig. 6) until it also engages the high speed contact 2D. Such rotation of the car switch results in energization of the full speed relay GR6. The full speed relay GR6 closes its make contacts GR6-1 (Fig. 5) to shunt a major proportion of the resistor R7. This results in full-speed energization of the bridge 21 and maximum excitation for normal car operation is supplied by the bridge to the field windings GEF1 and GEF2 of the main generator. Consequently, the motor MO rapidly accelerates to the maximum running speed.

It will be understood that as the voltage output of the generator GE increases the energization of the differential field winding RGD also increases. This field winding acts in opposition to the pattern field windings, and permits the voltage output of the generator to increase until a predetermined value thereof is reached.

The full speed relay also opens its break contacts GR6-2 (Fig. 6) to prevent energization therethrough of the windings of the inductor relays.

Closure of the make contact GR6-3 of the full speed relay results in energization of the brake regulator relay 65 through the make contacts 6—11 of the running relay and the make contacts 7—9 of the running contactor. Upon energization, the brake regulator relay 65 closes its make contacts 65—2 to establish a holding circuit around the contacts GR6-3. The energized relay 65 also opens its break contacts 65—1 to prevent energization therethrough of the brake modifier relay BC.

As the elevator car approaches the second landing, the car attendant centers the car switch CS to prepare for a stopping operation of the elevator car. Such centering of the car switch deenergizes the down relay DR, the auxiliary running relay 80 and the full speed relay GR6. The deenergized down relay DR opens its make contacts DR1, but such opening has no effect on the energization of the down switch D and the running relay 6 because of the holding circuit which includes the contacts L1-2, 40—3 and D6.

The make contacts DR2 also open, but have no effect on the energization of the cable-stretch relay 32B because of the holding circuit established through the contacts 32B14 and 7—8.

The auxiliary running relay 80, upon deenergization, closes its break contacts 80—1 to prepare the coils of the inductor relays for energization. In addition, contacts 80—2 of the auxiliary running relay open, but such opening has no effect on the energization of the timing relay 72T because of the holding circuit established through the contacts L1-3 and 72T2.

The deenergization of the full speed relay GR6 results in the opening of the make contacts GR6-1 (Fig. 5). Such opening reintroduces the portion of the resistor R7 between the taps connected to the contacts L3-1 and GR6-1 in series with the bridge 21. The resulting decrease in the field excitation of the main generator GE results in deceleration of the elevator car to a speed which may be of the order of 160 feet per minute.

The deenergization of the full speed relay also closes the break contacts GR6-2 (Fig. 6) to complete the following circuit:

L+1, CS, S, 1UL, 1DL, 2UL,
    2DL, 3L, GR6-2, 80—1, L—1

The coils of the inductor relays now are energized and the relays are conditioned to assist in a landing operation.

Contacts GR6-3 of the full speed relay open as a result of the deenergization of the relay but such opening has no immediate effect on the operation of the system because of the holding circuit established around these contacts by the contact 65—2.

As the elevator car approaches the second landing, the inductor relay 1DL reaches the inductor plate P for the second landing and at a distance, which may be of the order of 20½ inches from the second landing, the inductor relay 1DL closes its contacts 1DL1 (Fig. 6) to energize the down leveling relay LD. This relay also serves as a first landing relay.

Upon energization, the relay LD closes its make contacts LD1 (Fig. 5) but such closure has no immediate effect on the operation of the system. Also the relay opens its break contacts LD2, but such opening again has no immediate effect on the operation of the system.

The down leveling relay LD, upon energization, opens its break contacts LD3 (Fig. 6) but such opening has no immediate effect on the operation of the system. The closure of the make contacts LD4 at this time has no immediate effect on the operation of the system.

Finally, the energization of the down leveling relay LD results in opening of the break contacts LD5 to deenergize the leveling-field-control relay L3. The relay L3 thereupon opens its make contacts L3-1 (Fig. 5) to insert in series with the bridge, the portion of the resistor R7 which lies between the taps connected to the contacts L2-1 and L3-1. The resulting reduction in energization of the field windings of the main generator GE results in retardation of the elevator car to a lower speed which may be of the order of 80 feet per minute.

As the elevator car proceeds downwardly, the inductor relay 2UL reaches the inductor plate P (Fig. 1) for the second landing and this inductor relay opens its break contacts 2UL1 (Fig. 6). Such opening has no immediate effect on the operation of the system.

Further movement of the elevator car toward the second landing brings the inductor relay 3L to the inductor plate P for the second landing (Fig. 1) and this inductor relay operates to open its break contacts 3L1 (Fig. 6). Such opening deenergizes the second landing relay L2.

Upon deenergization, the second landing relay opens its make contacts L2-1 (Fig. 5). Such opening may occur at a distance of the elevator car of the order of 10 inches from the second landing. The opening of the contact L2-1 inserts the portion of the resistor R7 between the taps connected to the contacts L1-1 and L2-1 in series with the bridge 21. This further reduces the energization of the field windings of the main generator GE and the elevator car is retarded to a speed which may be of the order of 25 feet per minute.

Upon further movement of the elevator car towards the second landing, the inductor relay 2DL finally reaches the inductor plate P for the second landing (Fig. 1) at a point which places the elevator car approximately 2½ inches from the second landing. At this point, the inductor relay 2DL operates to open its break contacts 2DL1 (Fig. 6). This interrupts the energization of the third landing relay L1.

Upon deenergization, the third landing relay opens its make contacts L1-1 (Fig. 5) and the major part of the resistor R7 now is in series with the bridge 21. This further reduces the excitation of the main generator GE and the elevator car slows to a landing speed which may be of the order of 5 to 10 feet per minute.

The third landing relay L1 also opens its make contacts L1-2 but this has no immediate effect on the system for the reason that the contacts LD4 and LU4 establish a holding circuit for the relays D and 6. The contacts L1–3 also open to deenergize the timing relay 72T and this relay starts to time out.

Referring again to Fig. 1, the continued motion of the elevator car at its landing speed towards the second landing finally moves the inductor relay IDL past the end of the inductor plate P for the second landing sufficiently to cause this inductor relay to reopen its make contacts IDL1 (Fig. 6). Such reopening deenergizes the down leveling relay LD.

The deenergization of the relay LD may occur at a point in the travel of an elevator car such that if the elevator car brake is applied, the elevator car will drift accurately to a stop of the second landing. As a specific example, the drift distance may be of the order of ½ inch. The relay LD, upon deenergization, opens its make contacts LD1, but such opening has no immediate effect on the operation of the system.

The relay LD also closes its break contacts LD2 (Fig. 5) and its break contacts LD3 (Fig. 6), but these closures have no immediate effect on the operation of the system.

The deenergization of the down leveling relay also results in opening of the make contacts LD4 to deenergize the down switch D and the running relay 6. The down switch D, upon deenergization, opens its make contacts 1 to 7. Opening of the make contacts D1 (Fig. 5) results in application of the brake 5. As the brake leaves its fully open position, the contacts 5—1 close to insert a portion of the resistor R6 in the discharge circuit for the brake coil. The value of resistance inserted by closure of the contacts 5—1 is selected to provide a soft braking action. That is, the brake shoe is forced against the brake drum comparatively slowly. It should be noted that the discharge current from the brake coil passes through the rectifier 21, but this rectifier prevents current from the buses from flowing therethrough.

The down switch also opens its contacts D2 and D3 to disconnect the bridge from the buses.

The contacts D4 open but such opening has no immediate effect on the operation of the system. The contacts D5, D6 and D7 in opening also have no immediate effect on the operation of the system.

Upon deenergization, the running relay 6 opens its make contacts 6—1 (Fig. 5), but such opening has no immediate effect upon the operation of the system. The break contacts 6—2 close to prepare for the shunting of a portion of the resistor R2 therethrough. Opening of the make contacts 6—3 further serves to open the brake coil energizing circuit. It will be understood that when this circuit is deenergized, the brake-released relay closes its break contacts BR1 and BR2. The relay BR has a time delay in dropout determined by the discharge circuit for energy stored in the relay coil. Preferably the relay BR drops out just as the car comes to rest. The break contacts BR1 and 6—2 now shunt a portion of the resistor R2. The increased energization of the differential field winding rapidly changes the field excitation of the main generator to reduce the voltage output of the main generator to zero.

Continuing with the effect of the deenergization of the running relay 6, it should be noted that the make contacts 6—4 open in the circuit of the armature RGA of the regulating generator. However contacts 7—10 remain closed and the armature remains connected in the bridge. Consequently the differential field winding RGD remains effective to force the generator voltage to zero. The opening of the make contacts 6—5, 6—6 and 6—7 has no immediate effect on the operation of the system. The opening of the make contacts 6—8 disconnects the timing relay 6T from the buses and this relay starts to time out.

Make contacts 6—9 open, but such opening has no immediate effect on the operation of the system. The break contacts 6—10 close to reenergize the timing relay 72T. Thus the relay 72T is energized during floor-to-floor runs and while stopped at a landing. If the elevator car were to stall while attempting to make a landing, the relay 72T would time out and interrupt the energizing circuit for the running relay 6 and one of the switches U or D. Contacts 6—11 (Fig. 6) open to deenergize the brake regulator relay 65. The relay 65 closes its break contacts 65—1 and opens its make contacts 65—2 but these changes have no immediate effect on the system.

It will be recalled that the timing relay 6T has started to time out. Until this relay times out to open its make contact 6T1, the running contactor 7 remains energized. Consequently, the running contactor during this timing out period maintains the loop circuit for the main generator armature GEA and the motor armature MOA in closed condition. Moreover, the make contacts 7—2 and 7—3 remain closed. The break contacts 7—4 to 7—7 remain open to prevent energization of load zone relays which have not been previously energized. Also the make contacts 7—8 (Fig. 6) remain closed to maintain the energization of the cable-stretch relay 32B. The make contacts 7—9 remain closed to maintain the energization of the brake regulator relay 65. The make contacts 7—10 remain closed (Fig. 5) to maintain a closed armature circuit for the regulating generator.

During the timing out period of the relay 6T, the elevator car stops at the second landing and the doors and car gate are opened. Such opening of the doors and gates deenergizes the door relay 40 (Fig. 6) to open the make contacts 40—1 and 40—2.

*Operation B—Elevator car overruns second landing*

The elevator car in Operation A normally would land accurately at the second landing. However in a rare case it is conceivable that the elevator car may overrun the second landing. To illustrate the leveling operation of the elevator car for such an overrun, it will be assumed that the elevator car of Operation A overruns the second landing by more than ½ inch during the landing operation. This overrun occurs while the timing relay 6T is still timing out.

As a result of the overrun of the elevator car, the inductor relay IUL (Fig. 1) has its magnetic circuit completed by the inductor plate P for the second landing sufficiently to operate the contacts of the inductor relay. These contacts IUL1 (Fig. 6) consequently close to energize the up leveling relay LU.

The up leveling relay LU closes its make contacts LU1 (Fig. 5) to complete a low resistance discharge circuit for the brake coil 5a. Because of this low-resistance discharge circuit, the energy stored in the brake coil discharges slowly and the brake is unable to set fully before the elevator car is reversed.

The make contacts LU2 close, but such closure has no immediate effect on the operation of the system.

The make contacts LU3 of the up leveling relay (Fig. 6) close to establish the following energizing circuit.

L+1, LU3, LD3, U, 6, 72T1, L—1

The break contacts LU4 open to prevent energization of the down switch D and the break contacts LU5 open to prevent energization of the leveling field control relay L3.

Inasmuch as the up switch U now is energized, it closes its make contacts U1 (Fig. 5) to prepare the brake coil 5a for energization. The break contacts U2 and U3 close to connect the bridge 21 for energization with proper polarity for up travel of the elevator car. The make contacts U4 close, but since the contacts 32B11 remain open, such closure of the contacts U4 has no immediate effect on the operation of the system. The make contacts U5, U5, and U7 close but have no immediate effect on the operation of the system.

The running relay 6 closes its make contacts 6—1, but since the break contacts 32B1 are open, the closure of the make contacts 6—1 has no effect on the operation of the system at this time.

The break contacts 6—2 open to prevent shunting of a portion of the resistor R2. The make contacts 6—3 close to complete an energizing circuit for the brake coil 5a. The energization of the brake coil and the resulting opening of the brake occur before the brake has an opportunity to set completely. Consequently, the reversal of the elevator car takes place with no perceptible jar or bump. The make contacts 6—4 close but have no effect at this time because contacts 7—10 have remained closed. Closure of the make contacts 6—5, 6—6, and 6—7 has no immediate effect on the operation of the system. However, closure of the make contacts 6—8 reenergizes the timing relay 6T before the relay has had an opportunity to drop out. Closing of the make contacts 6—9 completes an energizing circuit for the brake-modifier relay BC. The relay BC opens its break contacts BC1 (Fig. 5) to increase the effective resistance of the resistor R6, but this does not immediately affect system operation. Also contacts BC-2 (Fig. 6) close to establish a holding circuit around the contacts 6—9. Opening of the break contact 6—10 deenergizes the timing relay 72T and this relay starts to time out. The time delay and dropout of the relay is ample for a normal leveling operation. Finally make contacts 6—11 close but this closure has no immediate effect on the system operation.

The elevator car now is conditioned for up travel and moves toward the second landing. During the course of such movement, the inductor relay 1UL (Fig. 1) begins to leave the associated inductor plate P and the relay contacts 1UL1 (Fig. 6) open to deenergize the up leveling relay LU.

The up leveling relay LU opens the make contacts LU1 (Fig. 5) to interrupt the low resistance discharge path for the brake coil 5a. The opening of the make contacts LU2 has no immediate effect on the operation of the system.

The opening of the make contacts LU3 (Fig. 6) interrupts the energizing circuit for the up switch U and the running relay 6.

The break contacts LU4 close but have no immediate effect on the system operation. Closure of the break contacts LU5 completes an energizing circuit for the leveling field control relay L3. This relay closes its make contacts L3-1 (Fig. 5) but since the elevator car is now in a condition to stop the closure of the contacts L3-1 has substantially no effect on the system operation.

Upon deenergization, the up switch U interrupts the energization of the brake coil 5a. As the brake begins to set, the contacts 5—1 close to introduce a substantial portion of the resistor R6 in the brake discharge circuit for the coil 5a. (It will be recalled that the contacts BC1 are open.) The brake thereupon is applied to provide a medium braking action. It should be noted that this braking action is faster and harder than that employed for a normal landing operation. Since the "brake" is applied faster, the full brake retarding force is developed more rapidly and the brake action may be said to be "harder." As previously explained, the term "harder" does not necessarily mean that the resultant braking force is larger but indicates that the car is brought to a stop more rapidly, as by an earlier full application of the brake. This reduces the likelihood of an overrun of the floor during the leveling operation.

Make contacts U2 and U3 open to interrupt the connection of the bridge to the buses. Opening of the make contacts U4, U5, U6 and U7 has no immediate effect on the operation of the system.

The running relay 6 opens its make contacts 6—1, closes its make contacts 6—2 and opens its make contacts 6—3 without further change in the operation of the system.

Opening of the make contacts 6—4, 6—5, 6—6, 6—7 and 6—9 has no immediate effect on the operation of the system.

Opening of the contacts 6—8 disconnects the timing relay 6T and this relay again starts to time out. As previously pointed out, when the time relay 6T has completed its time out, it interrupts the energization of the running contactor 7 (Fig. 5).

The closing of the break contacts 6—10 reenergizes the timing relay 72T. The opening of the make contacts 6—11 has no immediate effect on the system.

From the foregoing discussion it is believed that the operation of the system for floor-to-floor runs and for leveling following an overrun of a landing is clear. It will be understood that during down travel of the elevator car on a floor-to-floor run, the inductor relays 1DL, 3L, 2DL and 1DL are successively effective for a normal landing operation. For a floor-to-floor run in the up direction, the inductor relays 1UL, 3L, 2UL and 1UL are successively effective in a similar manner to produce a normal landing of the elevator car.

The up and down relays operate in a similar manner, one being effective to produce up travel and one being effective to produce down travel of the elevator car.

The full speed relay GR6 operates in the same manner for both up and down travel. It will be understood that for full speed up travel, the car switch CS engages both of the contacts 1U and 2U. For full speed down travelling, the car switch engages the two contacts 1D and 2D.

The up switch and the down switch operate in a similar manner respectively for up travel and down travel of the elevator car.

*Operation C.—Cable contracts, car levels down with heavy load*

It will be assumed next that after the fully loaded elevator car reaches the second landing, it is unloaded until the load remaining in the elevator car totals 8,000 pounds. The cable supporting the elevator car has some resilience and as the elevator car load increases and decreases, the cable stretches and contracts to some extent. It will be assumed that the reduction in the loading of the car from 10,000 to 8,000 pounds results in a cable contraction sufficient to move the elevator car ½ inch above the second landing.

Inasmuch as the elevator car is stopped at the second landing, the coils of the inductor relays IUL, IDL, 2UL, 2DL and 3L are energized by the following circuit:

L+I, CS, S, IUL, IDL, 2UL, 2DL, 3L, GR6-2, 80-I, L-I

Furthermore, the timing relay MT is energized through the closed contacts MD5 and the timing relay 72T is energized through the contacts 72T2 and 6-10.

The elevator car has remained at the second landing for a time sufficient to permit the timing relay 6T (Fig. 6) to time out. This relay consequently has opened its contacts 6T1 (Fig. 5) to deenergize the running contactor 7 and the running contactor has opened its make contacts 7-1, 7-2, 7-3, 7-8, 7-9 and 7-10, and has closed its break contacts 7-4 to 7-7. The opening of the contacts 7-8 (Fig. 6) has deenergized the cable-stretch relay 32B. Since neither set of contacts UR2 or DR2 is closed during Operation C, the relay 32B remains deenergized throughout the operation.

By reference to Fig. 1, it will be noted that as the elevator car loading decreases, the spring 11 expands and actuates the load weigher through the chain 14. As shown in Fig. 4, the contact condition in the load weigher for a load of 8,000 pounds is such that the contacts WC, F4, F5 and F6 are closed. The remaining contacts of the load weigher are open. Only the portion of the resistor R1 to the left of the contacts F4 as viewed in Fig. 4 is effective.

From the previous discussion of Fig. 1, it will be recalled that the movement of the elevator car for a distance of the order of ½ inch above the second landing moves the inductor relay IDL sufficiently with respect to the inductor plate for the second landing to operate the inductor relay. Consequently, the inductor relay closes its make contacts IDL1 (Fig. 6) to energize the down leveling relay LD. The down leveling relay closes its make contacts LD1, opens its break contacts LD2, opens its break contacts LD3 and opens its break contacts LD5. These contact changes have no immediate effect on the operation of the system.

At the same time, the down leveling relay LD closes its make contacts LD4 to establish the following circuit:

L+I, LD4, LU4, D, 6, 72T1, L-I

The down switch D closes its make contacts D1 (Fig. 5) to prepare the brake coil for energization. Also, contacts D2 and D3 close to prepare the bridge 21 for energization with proper polarity for down travel of the elevator car. The closures of make contacts D4, D5, D6 and D7 have no immediate effect on the operation of the system. It will be understood that the inductor relay contacts 2UL1, 2DL1 and 3L1 (Fig. 6) are all open.

The energized running relay 6 closes its make contacts 6-1 (Fig. 5) to establish an energizing circuit for the loop voltage relay B through the effective portion of the resistor R1. Break contacts 6-2 open to prevent shunting therethrough of a portion of the resistor R2. Make contacts 6-3 close to prepare the brake coil 5a for energization. Make contacts 6-4 close to establish a circuit for the armature of the regulating generator RG. Make contacts 6-5 close to energize the running contactor 7.

For this Operation C the cable-stretch relay 32B is deenergized. Consequently the auxiliary field windings RGL1 and RGL2 are effectively connected in the bridge 21 and assist the main pattern field windings in building up the output voltage of the main generator GE with great rapidity. The "split" bridge also is effective in increasing the rate at which the main generator voltage builds up. The entire resistor 21g is effective (contacts 32B6 are open) and a portion of the resistor R7 is shunted (contacts 32B10 are closed, and with contacts LW3-3, LW4-1 and MD2 establish a shunt path). Because of these factors the voltage of the main generator rapidly builds up to start the elevator car against the substantial friction which is present if the elevator car remains at rest for a substantial time.

Closures of the make contacts 6-6, 6-7 and 6-11 have no immediate effect on the operation of the system.

Make contacts 6-8 close to energize the timing relay 6T. Contacts 6-9 close to energize the brake-modifier relay BC and contacts 6-10 open to disconnect the timing relay 72T from the buses.

Turning now to the contactor 7 (Fig. 5), this contactor closes its make contacts 7-1 to complete the loop circuit for the armatures GEA and MOA. Contacts 7-2 close to establish the following energizing circuit for the brake coil:

L+I, D1, BR2, BR, 5a, R4, 6-3, 7-2, L-I

Since the resistor R4 is in circuit, the brake is only partially released, and leveling must be effected through the brake. Furthermore, the energization of the brake-released relay BR is insufficient to cause pick-up of this relay.

Inasmuch as the timing relay 6T (Fig. 6) has picked up to close its contact 6T1 (Fig. 5), closure of the make contacts 7-3 completes a holding circuit for the running contactor 7.

Break contacts 7-4 to 7-7 open to prevent subsequent pick-up of any of the load zone relays which has not previously picked up. In the present case, none of the load zone relays is energized.

Closure of the make contacts 7-8 and 7-9 (Fig. 6) and 7-10 (Fig. 5) has no immediate effect on the operation of the system.

The brake-modifier relay BC opens its break contacts BC1 (Fig. 5) to make effective a substantial portion of the resistor R6. In addition, this relay closes its make contacts BC2 (Fig. 6) to establish a holding circuit around the contacts 6-9.

The timing relay 72T has started to time out but it will be recalled that this relay has a substantial delay in dropout.

Referring again to Fig. 5, it will be noted that the closure of the contacts 6-6 has completed an energizing circuit for the motion detector advancer MDA. Consequently, the pin 20d of the motion detector is moved into contact with the brake drum 3.

Since the system now is conditioned for down travel, the car starts to move down. At the immediate start of the down travel, the following circuit is established by movement of the pin 20b:

L+1, 20b, 20e, D4, MD, 32B11, L−1

The motion detector relay MD thereupon picks up to close its make contacts MD1. The closure of the contacts MD1 establishes a shunt across a substantial portion of the resistor R2 through the closed make contacts MT1. This increases the energization of the differential field winding RGD. It reduces the rate at which the voltage output of the main generator increases. In the present case the increased energization of the differential field winding forces the voltage output of the main generator towards a lower value.

Break contacts MD2 open to make effective the entire resistor R7. This tends to reduce the excitation of the main generator. A portion of the resistor R7 previously had been shunted through the contacts LW4−1, LW3−3, 32B10 and MD2.

Closure of the break contacts MD3 has no immediate effect on the operation of the system, but closure of the make contacts MD4 establishes a holding circuit for the motion detector relay around the contacts 20e and the pin 20b.

By reference to Fig. 6, it will be noted that the break contacts MD5 of the motion detector relay open to disconnect the time relay MT from the associated buses. This relay starts to time out. Inasmuch as the resistor R8 is not connected across the timing relay (contacts LW2−4 are open), the timing relay MT has a comparatively short delay in dropout. Upon the expiration of this delay, the timing relay opens its make contacts MD1 (Fig. 5) to reinsert the entire resistor R2 in the energizing circuit for the differential field winding RGD. Because of the short delay the differential field winding has not had time to force the output voltage of the generator GE to a very low value. Consequently, a relatively high voltage output from the generator GE is available for the leveling operation.

As the elevator car returns to the second landing, the inductor relay IDL (Fig. 1) leaves the associated inductor place sufficiently to dropout. The resulting opening of the make contacts IDL1 (Fig. 6) deenergizes the down leveling relay LD. This relay opens its make contacts LD1 (Fig. 5), but such opening has no immediate effect on the operation of the system. Reclosure of the break contacts LD2 (Fig. 5) and LD3 (Fig. 6) has no immediate effect on the operation of the system. However, opening of the make contacts LD4 deenergizes the down switch D and the running relay 6. Also, the break contacts LD5 reclose to energize the leveling-field-control relay L3. Since the elevator car now is conditioned to stop, the energization of the relay L3 has substantially no effect on the system.

The deenergization of the down switch D and the running relay 6 results in the stopping of the elevator car in a manner which will be apparent from the foregoing discussions. It should be noted that as the brake is applied, the entire resistor R6 is connected in the discharge circuit of the brake coil 5a. Consequently, an extremely fast and hard brake is applied to stop the elevator car accurately at the second landing.

The deenergizations of the down switch D and the running relay 6 not only operate as heretofore explained, but also serve to deenergize the motion detector relay MD (contacts D4 open) and to deenergize the motion detector advancer MDA (contacts 6−6 open). Furthermore, the closure of the contacts 6−2 (Fig. 5) shunts a portion of the resistor R2 through the contacts 32B2. The increased energization of the differential field winding rapidly reduces the field excitation of the regulating generator preparatory to a reversal if required.

*Operation D.—Leveling a balanced load*

For the purpose of the next illustration of system operation, it will be assumed that the elevator car has been unloaded until it contains a load of only 4,000 pounds which is in the balanced range. Because of cable contraction, the elevator car has moved above the second landing sufficiently for operation of the inductor relay IDL. It will be recalled that the inductor relay coils, the timing relay 72T and the timing relay MT under these circumstances are all energized. Furthermore, it will be assumed that the brake-modifier relay BC, which was energized in the preceding example, remains energized because of its closed contacts BC2 (Fig. 6). The cable-stretch relay 32B remains deenergized.

By reference to Fig. 4, it will be observed that for a 4,000 pound load, the load weigher has closed contacts WB. Also contacts E1 and F1 of the load weigher are closed. (If an empty car is loaded, the contacts F1 may be assumed to close just before the loading reaches 4,000 pounds and the contacts E1 may be assumed to open if the load is further increased.) These contacts determine the effective value of the resistance of the resistor R1, and for the 4,000 pound loading the effective value is zero.

Upon operation, the inductor relay IDL closes its make contacts (Fig. 6) to energize the down leveling relay LD. The relay LD, together with the down switch D, the running relay 6 and the running contactor 7 operates in the manner described in the preceding Operation C. In addition, by reference to Fig. 5, it will be noted that the contacts WB were closed and the load zone relay LW2 was energized prior to opening of the contacts 7−5 of the running contactor. This is the only load zone relay that is energized. This relay closes its make contacts LW2−1 to establish a self-holding circuit around break contacts 7−5 and the make contacts WB.

The load zone relay LW2 also closes its make contacts LW2−2 (Fig. 6) and LW2−3 to establish the following energizing circuit:

L+1, LW2−2, D5, LW1−4, LW2−3, BA, L−1

The energization of the brake relay BA results in closure of the make contacts BA1 (Fig. 5) to shunt resistor R4. Consequently, the brake can be completely released upon closure of the make contacts D1, 6−3 and 7−2. In addition, the brake relay BA closes its make contacts BA2 (Fig. 6) to establish with the make contacts 6−7 a holding circuit for the brake relay.

Since the brake coil 5a is fully energized, the brake-released relay BR also is energized and opens its break contacts BR1 and BR2. Opening of the contacts BR1 has no immediate effect on the operation of the system. Opening of the contacts BR2 introduces the resistor R3 in the brake circuit for the purpose of decreasing the current passing through the brake coil to a value sufficient merely to maintain the brake fully released.

It is believed that the remainder of the operation for this example will be understood from the discussion of the preceding example. The essential difference is that for the balanced load range, the brake is fully released rather than partially released as in the preceding example.

The present example also applies substantially when the elevator car is to be leveled in an up direction in order to compensate for cable stretch. The only essential difference is that the leveling operation is initiated by the up leveling relay IUL rather than by the down leveling relay IDL. It is believed that the circuit changes for the up leveling operation under balanced load conditions will be understood from the preceding discussion.

*Operation E.—Cable contracts-empty car levels*

For the next operation, it will be assumed that the elevator car has been completely emptied. Because of cable contraction, the elevator car has moved somewhat more than ½ inch above the second landing. As shown in Fig. 4, the condition of the load weigher is such that only the contacts E4, WA and WB are closed. Such closure conditions the load zone relays LW1 and LW2 (Fig. 5) for energization upon the closure of contacts 6—6 (the cable-stretch relay 32B remains deenergized and contacts 32B11 are closed). The operation of the system in the present case is the same as that set forth in Operation C above, except as modified by the relays LW1, LW2, BA, and BR. For this reason, only the modifications introduced by the latter relays will be considered at this time.

When the contacts 6—6 (Fig. 5) close, the load zone relays LW1 and LW2 are energized. The energized load zone relay LW1 closes its make contacts LW1-1 to reduce the effective resistance of the resistor R7. Furthermore, the contacts LW1-2 close to establish a holding circuit around the contacts WA and 7—4. Referring to Fig. 6, it will be noted that the break contacts LW1-3 and LW1-4 open.

With reference to the load zone relay LW2, energization thereof results in closure of the make contacts LW2-1 to establish a holding circuit around the contacts WB, 7—5. In addition, contacts LW2-2 (Fig. 6) and LW2-3 close.

By reference to Operation C above, it will be noted that at the initiation of the leveling operation, the brake is partially released. Such partial release is also provided in the present Operation E until the loop voltage relay B is energized sufficiently to pick up and the partially-released brake holds the car stationary against forces due to unbalanced loading, but permits movement due to motor torque. As a result of such pick-up of the relay B, make contacts B1 (Fig. 6) close to establish the following circuit:

L+1, LW2-2, D5, B1, BA, L—1

The energized brake relay BA closes its make contacts BA1 to shunt the resistor R4 (Fig. 5). This means that the brake is fully energized and is fully released. However, the full release of the brake does not occur until pick-up of the relay B indicates that the generator GE has developed sufficient voltage to support the hauling load represented by the empty car. In addition, the brake relay BA closes its make contacts BA2 to establish with the contacts 6—7 a holding circuit therefor.

Since the brake coil is fully energized, the brake-released relay BR is energized sufficiently to open its break contacts BR1 and BR2. The contacts BR1 have no immediate effect on the operation of the system, but the opening of the contacts BR2 introduces the current limiting resistor R3 in the brake energizing circuit.

As the elevator car comes to a stop accurately at the desired landing, the relays common to Operations E and C operate in a similar manner. In addition, it may be pointed out that the opening of the contact 6—6 (Fig. 5) deenergizes the load zone relays LW1 and LW2. Furthermore, the opening of the contacts 6—7 (Fig. 6) deenergizes the brake relay BA.

Inasmuch as the brake-modifier relay BC is picked up and the cable stretch relay 32B is deenergized, the entire resistor R6 is still effective in the discharge circuit for the brake coil and a fast, hard brake is applied to stop the elevator car at the desired landing.

*Operation F.—Cable stretches, empty car levels*

If because of cable stretch the empty car is below the desired landing, a somewhat different leveling operation is employed for the reason that the elevator car presents an over-hauling load for the driving motor. Inasmuch as the elevator car is assumed to be empty, the condition of the load weigher is similar to that of the preceding example (Operation E).

Assuming that the cable stretch has dropped the elevator car at least ½ inch below the desired landing, the inductor relay IUL operates to energize the up leveling relay LU. It will be understood that at the beginning of the leveling operation, the inductor relay coils, the timing relay 72T, the timing relay MT and the brake-modifier relay BC are assumed to be all energized. The cable stretch relay 32B is deenergized.

The up leveling relay LU closes its make contacts LU1 (Fig. 5) but such closure has no immediate effect on the operation of the system. Contacts LU2 close, but such closure has no immediate effect on the operation of the system.

Closure of the make contact LU3 establishes the following circuit:

L+1, LU3, LD3, U, 6, 72T1, L—1

In addition, contacts LU4 open to prevent energization therethrough of the down switch D. Contacts LU5 open to prevent energization of the leveling-field-control relay L3.

The energization of the up switch U and the running relay 6 operates in the manner previously described to condition the elevator system for up travel. As a result of operation of the up switch U and the running relay 6, it will be recalled that not only these relays are picked up but the running contactor 7, the timing relay 6T and the load zone relay LW1 and LW2 are also picked up. In addition, the timing relay 72T starts to time out.

The closing of the contacts U1, 6—3 and 7—2 (Fig. 5) energizes the brake coil 5a, but since the contacts BA1 are open, the brake coil is energized to release the brake only partially. In this particular case, the leveling of the empty car in the up direction is effected with the brake partially applied.

The loop voltage relay B picks up when the generator GE reaches a voltage determined by the effective resistance value of the resistor R1. However, the closure of the contacts B1 in Fig. 6 does not pick the relay BA up for the reason that the contacts LW1-3 and D5 are open. Consequently, the brake continues to remain partially applied.

The motion detector relay MD and the timing relay MT operate in the manner previously described. Inasmuch as the contacts 32B3 of the cable stretch relay and the contacts BC1 of the brake-modifier relay are open, the brake is applied with a fast and hard action at the conclusion of the leveling operation.

*Operation G.—Cable stretches, fully loaded car levels up*

In the final example, it will be assumed that the elevator car is fully loaded and that the loaded car has dropped at least ½ inch below the desired landing, the elevator car gate and the associated hoistway doors are assumed to be open. At the start of the leveling operation, the inductor relay coils, the timing relay 72T and the timing relay MT are assumed to be energized. The cable stretch relay 32B is deenergized.

As a result of the drop of the elevator car, the inductor relay 1UL operates to close its make contacts 1UL1 (Fig. 6). This results in energization of the up leveling relay LU. The up leveling relay LU closes its make contacts LU1 (Fig. 5), but such closure has no immediate effect on the operation of the system. In addition, contacts LU2 close.

For fully loaded cars, the load weigher (Fig. 4) has its contacts WC and WD closed. The remaining contacts are all open. Since the contacts WC and WD are closed, the load zone relays LW3 and LW4 are conditioned for energization upon closure of the contacts LU2 and 6—6 (contacts 32B12 are closed).

The up leveling relay LU closes its contacts LU3 to establish the following energizing circuits:

L+1, LU3, LD3, U, 6, 72T1, L−1

The up switch U and the running relay 6, when energized, cooperate in the manner previously discussed to condition the elevator car for travel in the up direction.

Opening of the contacts LU4 prevents energization of the down switch D. Opening of the contacts LU5 prevents energization of the leveling-field-control relay L3.

At this stage, the coils of the inductor relay, the up switch U, the running relay 6, the running contactor 7, the timing relay 6T and the load zone relays LW3 and LW4 are all energized. The timing relay 72T has started to time out. Also, the brake relay BA is deenergized. The contacts BA1 (Fig. 5) are open. Since the resistor R4 is in the brake circuit, the brake is only partially released, and holds the elevator car from movement until motor torque is developed.

As the voltage output of the generator GE builds up, it reaches a value sufficient to pick up the loop voltage relay B. Inasmuch as the car is fully loaded, the entire resistor R1 is effective and a substantial voltage is necessary to effect pick-up of the relay B. Inasmuch as the contacts LW4–3, 32B10 and MD2 are closed, a substantial portion of the resistor R1 is shunted and the generator voltage builds up rapidly to a value sufficient to start the elevator car against any friction.

On picking up, the relay B closes its make contacts B1 (Fig. 6) to establish the following circuit:

L+1, U5, LW1–3, B1, BA, L−1

The brake relay BA thereupon closes its make contacts BA1 (Fig. 5) to shunt the resistor R4. The brake coil 5a now is fully energized and fully releases the brake to permit movement of the elevator car. Inasmuch as the brake coil was partially energized, the full release of the brake when the coil is fully energized is very rapid. In addition, the brake relay BA closes its make contacts BA2 (Fig. 6) to establish with the contacts 6—7 a holding circuit for the brake relay.

Since the brake coil is fully energized, sufficient current passes through the brake-released relay BR to pick up this relay. For this reason, the brake contacts BR1 and BR2 are opened. The opening of the contacts BR1 has no immediate effect on the system operation, but the opening of the contacts BR2 inserts the current limiting resistor R3 in the brake circuit.

The closure of the contacts 6—6 (Fig. 5) established an energizing circuit for the motion detector advancer MDA. Consequently, when the elevator car starts to move, the pin 20b is promptly carried into engagement with the contacts 20d to establish the following circuit:

L+1, 20b, 20d, U4, MD, 32B11, L−1

The motion detector relay MD closes its contacts MD1 to establish with the contact MT1 a shunt for a substantial portion of the resistor R2. This increases the effectiveness of the differential field winding RDG in forcing down the voltage of the main generator GE.

Contacts MD2 open to increase the effective value of the resistance introduced by the resistance R7 in series with the bridge. It will be recalled that the contacts LW3–1, LW3–2, LW4–2 and LW4–3 are all closed, whereas the contacts LW4–1 and LW3–3 are open. These contacts shunt appreciable portions of the resistor R7 and increase the rate at which the generator GE builds up its voltage. The opening of the contacts MD2 introduces the portion of the resistor R7 between the contacts LW4–2 and LW3–2 into the bridge circuit, and decrease the excitation of the main generator after the car starts to move.

Closure of the contacts MD3 establishes a holding circuit around the contacts 20d and the pin 20b. Closure of the contacts MD4 has no effect on the immediate system operation.

The motion detector relay also opens its break contacts MD5 (Fig. 6) to start a timing out operation of the timing relay MT. Since the resistor R8 is not connected across the relay MT, this relay has a comparatively short drop out time. When the relay does drop out, it opens the contacts MT1 (Fig. 5) to reintroduce the entire resistor R2 in series with the differential field winding RGD. The early reduction in the effectiveness of the differential field winding of the regulating generator assures a large leveling voltage for the driving motor MO.

As the elevator car moves up, the inductor relay 1UL finally leaves the inductor plate piece sufficiently to open its make contacts 1UL1. The resulting deenergization of the up leveling relay LU results in the stopping of the elevator car accurately at the desired landing in a manner which will be apparent from the foregoing discussion. Since the brake-modifier relay BC also is picked up under the assumed conditions, the contacts BC1 (Fig. 5) are open, and the brake is applied with a hard and fast action to prevent the elevator car from overrunning the desired landing.

Although the invention has been described with reference to certain specific embodiments thereof, numerous other modifications are possible falling within the spirit and scope of the invention.

We claim as our invention:

1. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means for operating the brake mechanism at a predetermined distance from the predetermined landing to produce a first braking effort to stop the elevator car at the landing, means responsive to travel of the elevator car past the landing after initiation of a stopping operation thereof for retarding the production of said first braking effort to permit a return of the elevator car toward the landing prior to setting of the brake mechanism, means responsive to overtravel of the elevator car relative to the landing at which it is to stop for returning the elevator car toward the landing and for operating the brake mechanism to produce a second braking effort larger than the first braking effort to stop the elevator car at the landing, means responsive to movement of the elevator car without motion of the driving motor away from the landing at which the car has stopped for returning the elevator car toward the landing and for operating the brake mechanism to produce a third braking effort which is greater than the second braking effort during the return of the elevator car to stop the elevator car substantially at the landing, said motive means comprising a direct-current main generator having an armature, a first field winding and a second field winding, connections connecting the generator armature and the armature of the driving motor in a loop circuit, said control means further including a regulating generator having an armature and first, second, third, fourth, fifth and sixth field windings, a bridge circuit having first, second, third and fourth arms connected consecutively in a bridge ring, the first arm including the first field windings and the third arm including the second field windings, said regulating generator armature being connected across a first diagonal of the bridge ring, means selectively connecting the third field winding in said first arm and the fourth field winding in said third arm, connections for energizing the fifth winding in accordance with current in said loop, connections for energizing the sixth field winding substantially in accordance with the voltage applied to the driving motor armature to oppose the field energization of the first and second regulating generator field windings, said first, second, third, fourth and fifth field windings of the regulating generator being connected to provide cumulative field excitation, means for energizing the regulating generator and the loop circuit to start the elevator car, said driving motor having a load dependent on the load of the car, load-responsive means for controlling the release of the brake mechanism, said load-responsive means being responsive to a substantially balanced load on said driving motor for releasing the brake mechanism at a first rate, said load-responsive means being responsive to a substantial hauling load on the driving motor for releasing the brake mechanism at a second rate which is slower than the first rate, said load-responsive means being responsive to a substantial overhauling load on the driving motor for maintaining a partial application of the brake mechanism during leveling of the elevator car, means controlled by the load-responsive means when the elevator car is being releveled for energizing the driving motor with a first energization for a substantially balanced load on the driving motor and for energizing the driving motor with a second energization which is larger than the first energization if the load on the driving motor is substantially unbalanced, motion detector means responsive to initial movement of the driving motor from a standstill position at the start of a leveling operation for decreasing the energization of the driving motor, said brake mechanism having a coil which is electrically de-energized to operate the brake-mechanism, coil connections for energizing the coil, a discharge circuit for electrical energy stored in the coil, said discharge circuit including a rectifier poled to block passage of electrical current therethrough from the coil connections, excitation control means responsive to initial motion of the driving motor to level the elevator car for reducing the generator field excitation, the excitation control means being responsive to said initial motion of the driving motor to level the elevator car for first increasing the excitation of the sixth field winding of the regulating generator, and second decreasing the excitation of the sixth field winding in time dependent on the load on the driving motor.

2. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means for operating the brake mechanism at a predetermined distance from the predetermined landing to produce a first braking effort to stop the elevator car at the landing, and means responsive to travel of the elevator car past the landing after initiation of a stopping operation thereof for retarding the production of said first braking effort to permit a return of the elevator car toward the landing prior to setting of the brake mechanism.

3. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means for operating the brake mechanism at a predetermined distance from the predetermined landing to produce a first braking effort to stop the elevator car at the landing, means responsive to travel of the elevator car past the landing after initiation of a stopping operation thereof for retarding the production of said first braking effort to permit a return of the elevator car toward the landing prior to setting of the brake mechanism, and means responsive to overtravel of the elevator car relative to the landing at which it is to stop for returning the elevator car toward the landing and for operating the brake mechanism to produce a second braking effort larger than the first braking effort to stop the elevator car at the landing.

4. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means for operating the brake mechanism at a predetermined distance from the predetermined landing to produce a first braking effort to stop the elevator car at the landing, means responsive to travel of the elevator car past the landing after initiation of a stopping operation thereof for retarding the production of said first braking effort to permit a return of the elevator car toward the landing prior to setting of the brake mechanism, means responsive to overtravel of the elevator car relative to the landing at which it is to stop for returning the elevator car toward the landing and for operating the brake mechanism to produce a second braking effort larger than the first braking effort to stop the elevator car at the landing, and means responsive to movement of the elevator car without motion of the driving motor away from the landing at which the car has stopped for returning the elevator car toward the landing and for operating the brake mechanism to produce a third braking effort which is greater than the second braking effort during the return of the elevator car to stop the elevator car substantially at the landing.

5. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means for operating the brake mechanism at a predetermined distance from the predetermined landing to produce a first braking effort to stop the elevator car at the landing, and means responsive to overtravel of the elevator car relative to the landing at which it is to stop for returning the elevator car toward the landing and for operating the brake mechanism to produce a second braking effort larger than the first braking effort to stop the elevator car at the landing.

6. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means for operating the brake mechanism at a predetermined distance from the predetermined landing to produce a first braking effort to stop the elevator car at the landing, and means responsive to movement of the elevator car without motion of the driving motor away from the landing at which the car has stopped for returning the elevator car toward the landing and for operating the brake mechanism to produce a second braking effort which is greater than the first braking effort during the return of the elevator car to stop the elevator car substantially at the landing.

7. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, means responsive to overtravel of the elevator car relative to the landing at which it is to stop for returning the elevator car toward the landing and for operating the brake mechanism to produce a second braking effort larger than the first braking effort to stop the elevator car at the landing, and means responsive to movement of the elevator car without motion of the driving motor away from the landing at which the car has stopped for returning the elevator car toward the landing and for operating the brake mechanism to produce a third braking effort which is greater than the second braking effort during the return of the elevator car to stop the elevator car substantially at the landing.

8. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said motive means comprising a direct-current main generator having an armature, a first field winding and a second field winding, connections connecting the generator armature and the armature of the driving motor in a loop circuit, said control means further including a regulating generator having an armature and first, second, third, fourth and fifth field windings, and a bridge circuit having first, second, third and fourth arms connected consecutively in a bridge ring, the first arm including the first field windings and the third arm including the second field windings, said regulating generator armature being connected across a first diagonal of the bridge ring, means selectively connecting the third field winding in said first arm and the fourth field winding in said third arm, connections for energizing the fifth winding in accordance with current in said loop circuit.

9. A system as claimed in claim 8 in combination with a sixth field winding for the regulating generator, connections for energizing the sixth field winding substantially in accordance with the voltage applied to the driving motor armature to oppose the field energization of the first and second regulating generator field windings, said first, second, third, fourth and fifth field windings of the regulating generator being connected to provide cumulative field excitation, and means for energizing the regulating generator and the loop circuit to start the elevator car.

10. In a motor drive system, a direct-current motor having an armature, a direct-current main generator having an armature and a field winding, connections connecting said armatures in a loop circuit and a regulating generator for controlling the energization of said field winding, said regulating generator having first and second field-excitation means connected for operation in accordance with a single variable quantity and selectively operable for providing any of a plurality of volt-per-ampere characteristics for the regulating generator.

11. A system as claimed in claim 10 wherein said field excitation means comprises a first field winding for the regulating generator, a source of energy for the first field winding, a second field winding for the regulating generator and switching means selectively operable for connecting the second field winding for energization from said source of energy and for disconnecting said second field winding.

12. In a motor drive system, a direct current motor having an armature, a direct-current main generator having an armature, a first field winding and a second field winding, connections connecting said armatures in a loop circuit, and a regulating generator for controlling the energization of said field windings, said regulating generator having an armature, and first, second, third and fourth field windings, connections establishing a bridge circuit having first, second, third and fourth arms consecutively located in a bridge ring, the first arm including said first field windings and said third arm including said second field windings, switching means for selectively connecting the third field winding in the first arm and the fourth field winding in the third arm, and connections connecting the armature of the regulating generator across one diagonal of the bridge ring.

13. A system as claimed in claim 12 wherein the regulating generator has a differential field winding connected for energization in accordance substantially with the voltage applied to the armature of said motor.

14. A system as claimed in claim 13 wherein the regulating generator has a sixth field winding connected for energization in accordance with current flowing in said loop circuit.

15. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said driving motor having a load dependent on the load of the car, load-responsive means for controlling the release of the brake mechanism, said load-responsive means being responsive to a substantially balanced load on said driving motor for releasing the brake mechanism at a first rate, and said load-responsive means being responsive to a substantial hauling load on the driving motor for releasing the brake mechanism at a second rate which is slower than the first rate.

16. In an elevator system for a structure having landings, an elevator car, motive means including a driving motor for moving the elevator car relative to the structure to serve the landings, and control means for stopping and leveling the elevator car at a predetermined landing of said structure, said control means comprising brake mechanism operable for producing a braking effort to stop the elevator car, said driving motor having a load dependent on the load of the car, load-responsive means for controlling the release of the brake mechanism, said load-responsive means being responsive to a substantially balanced load on said driving motor for releasing the brake mechanism at a first rate, and said load-responsive means being responsive to a substantial overhauling load for maintaining a partial application of the brake mechanism during leveling of the elevator car.

17. In an elevator system for a structure having landings, an elevator car, motive means including a driving motor for moving the elevator car relative to the structure to serve the landings, and control means for stopping and leveling the elevator car at a predetermined landing of said structure, said control means comprising brake mechanism operable for producing a braking effort to stop the elevator car, said driving motor having a load dependent on the load of the car, and load-responsive means for controlling the release of the brake mechanism, said load-responsive means being responsive to a substantial overhauling load for maintaining a partial application of the brake mechanism during leveling of the elevator car.

18. In an elevator system for a structure having landings, an elevator car, motive means including a driving motor for moving the elevator car relative to the structure to serve the landings, and control means for stopping and leveling the elevator car at a predetermined landing of said structure, said control means comprising brake mechanism operable for producing a braking effort to stop the elevator car, said driving motor having a load dependent on the load of the car, load-responsive means for controlling the release of the brake mechanism, said load-responsive means being responsive to a substantially balanced load on said driving motor for releasing the brake mechanism at a first rate, said load-responsive means being responsive to a substantial hauling load on the driving motor for releasing the brake mechanism at a second rate which is slower than the first rate, and said load-responsive means being responsive to a substantial overhauling load for maintaining a partial application of the brake mechanism during leveling of the elevator car.

19. In an elevator system for a structure having landings, an elevator car, motive means including a driving motor for moving the elevator car relative to the structure to serve the landings, and control means for stopping the elevator car at a predetermined landing of said structure, said control means comprising leveling means for leveling the elevator car to a desired landing, said driving motor having a load dependent on the load of the car, load-responsive means, and means controlled by the load-responsive means when the elevator car is being releveled for energizing the driving motor with a first energization for a substantially balanced load on the driving motor and for energizing the driving motor with a second energization which is larger than the first energization if the load on the driving motor is substantially unbalanced.

20. A system as claimed in claim 19 in combination with motion detector means responsive to initial movement of the driving motor from a standstill position at the start of a leveling operation for changing the energization of the driving motor.

21. In an elevator system for a structure having landings, an elevator car, motive means including a driving motor for moving the elevator car relative to the structure to serve the landings, and control means for stopping the elevator car at a predetermined landing of said structure, said control means comprising means for supplying energy to the driving motor for leveling the elevator car, and means responsive to initial motion of the driving motor to level the elevator car and to the load on the motor for changing the energization of the driving motor in a time dependent on the load on the driving motor.

22. In an elevator system for a structure having landings, an elevator car, motive means including a driving motor for moving the elevator car relative to the structure to serve the landings, and control means for stopping the elevator car at a predetermined landing of said structure, said control means comprising means for supplying energy to the driving motor for leveling the elevator car, means responsive to acceleration of the driving motor for decreasing the energy supplied to the driving motor at a first rate, means responsive to initial motion of the driving motor to level the elevator car for decreasing at a second rate which is greater than the first rate the energy supplied to the driving motor, and means responsive to the load on the motor for maintaining the second rate for a time dependent on the loading of the driving motor.

23. A system as claimed in claim 22 wherein the last-named means changes the rate at which the energy is supplied to the driving motor to a lower rate upon the expiration of time measured from said initial motion which is longer for a light load than for a heavy load on the driving motor.

24. In a motor drive system, a direct-current motor having an armature, a direct-current main generator having an armature and a field winding, connections connecting said armatures in a loop circuit and a regulating generator for controlling the energization of said field winding, said regulating generator having a pattern field winding and a differential field winding, connections for energizing the pattern and differential field windings to produce opposing field excitations for the regulating generator, said differential field winding being connected in a circuit for energization substantially in accordance with the voltage supplied to the armature of said motor, and means responsive to the initial motion of the driving motor from a standstill position for changing the ratio of the energization of the differential field winding relative to the voltage supplied to the armature of said motor.

25. A system as claimed in claim 24 wherein said last-named means comprises means for decreasing the resistance of the differential field winding circuit to change said ratio.

26. A system as claimed in claim 24 wherein said last-named means comprises means responsive to the lapse of a substantial time after said initial motion for further changing said ratio of the energization of the differential field winding relative to the voltage supplied to the armature of said motor.

27. A system as claimed in claim 24 wherein said last-named means comprises means for decreasing the resistance of the differential field winding circuit to change said ratio, in combination with means responsive to the lapse of time measured from said initial motion and to the loading of the driving motor for increasing the resistance of said field winding circuit after the lapse of a period of time which is greater for a light loading than for a heavy loading of the motor.

28. In a motor drive system, a driving motor, releasable electroresponsive brake mechanism for opposing rotation of the driving motor, said brake mechanism including a coil which is energized to release the brake mechanism, coil connections for energizing the coil, and a discharge network for electrical energy stored in the coil, said discharge network including a first discharge circuit connected across said coil, said first discharge circuit containing resistance, and a second discharge circuit connected across the coil, said second discharge circuit having a rectifier which is poled to block passage of electrical current therethrough when the coil is connected to a source of direct current to release the brake mechanism, said rectifier permitting passage of current resulting from energy stored in the coil.

29. In an elevator system a structure having an elevator hoistway, an elevator car mounted for movement through the hoistway, an inductor assembly mounted on the elevator car, said inductor assembly comprising a plurality of inductor relays aligned and spaced from each other in the direction of travel of the elevator car, and an inductor plate secured to the structure and positioned to complete magnetic circuits successively for the inductor relays as the elevator car travels in the hoistway, the end inductor relays of the assembly having a spacing slightly greater than the corresponding dimension of the inductor plate, and the inductor assembly including a center inductor relay midway between said end inductor relays.

30. A system as claimed in claim 29 wherein the inductor assembly includes a separate inductor relay between the center inductor relay and each of the end inductor relays.

31. In an elevator system for a structure having landings, an elevator car, motive means including a direct-current driving motor for moving the elevator car relative to the structure to serve the landings, a direct-current main generator, said motor and generator having armatures connected in a loop circuit, and control means for stopping the elevator car at a desired landing of the structure, said control means comprising releasable braking mechanism for stopping the elevator car, means for leveling the elevator car to a desired landing, and voltage-responsive means responsive to the voltage output of the generator for controlling the release of the braking mechanism to permit a leveling operation by said leveling means.

32. A system as claimed in claim 31 in combination with load-controlled means for adjusting the response of the voltage-responsive means in accordance with the loading of the driving motor to release the braking mechanism in response to a voltage output of the generator which for a hauling load increases with the load.

33. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said motive means comprising a direct-current main generator having an armature, a first field winding and a second field winding, connections connecting the generator armature and the armature of the driving motor in a loop circuit, said control means further including a regulating generator having an armature and first and second field windings, a bridge circuit having first, second, third and fourth arms connected consecutively in a bridge ring, the first arm including the first field windings and the third arm including the second field windings, said regulating generator armature being connected across a first diagonal of the bridge ring, means responsive to arrival of said elevator car while traveling at substantial speed at a point a predetermined distance in advance of a landing at which it is to stop for modifying the energization of the regulating generator to slow said elevator car, and means responsive to arrival of said elevator car at a point nearer than said predetermined point to said last-named landing for applying said brake mechanism.

34. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said motive means comprising a direct-current main generator having an armature, a first field winding and a second field winding, said field windings being similar, connections connecting the generator armature and the armature of the driving motor in a loop circuit, said control means further including a regulating generator having an armature and first, second, third, fourth and fifth field windings, said last-named first and second field windings being similar, a bridge circuit having first, second, third and fourth arms connected consecutively in a bridge ring, the first arm including the first field windings and the third arm including the second field windings, said regulating generator armature being connected across a first diagonal of the bridge ring, means selectively connecting the third field winding in said first arm and the fourth field winding in said third arm, connections for energizing the fifth winding in accordance with current in said loop circuit, a sixth field winding for the regulating generator, connections for energizing the sixth field winding substantially in accordance with the voltage applied to the driving motor armature to oppose the field energization of the first and second regulating generator field windings, said first, second, third, fourth and fifth field windings of the regulating generator being connected to provide cumulative field excitation, means for energizing the regulating generator and the loop circuit to start the elevator car, means responsive to arrival of said elevator car while traveling at substantial speed at a point a predetermined distance in advance of a landing at which it is to stop for modifying the energization of the regulating generator to slow said elevator car, and means responsive to arrival of said elevator car at a point nearer than said predetermined point to said last-named landing for applying said brake mechanism.

35. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said motive means comprising a direct-current main generator having an armature, a first field winding and a second field winding, connections connecting the generator armature and the armature of the driving motor in a loop circuit, said control means further including a regulating generator having an armature and first and second field windings, a bridge circuit having first, second, third and fourth arms connected consecutively in a bridge ring, the first arm including the first field windings and the third arm including the second field windings, said regulating generator armature being connected across a first diagonal of the bridge ring, a further field winding for the regulating generator, connections for energizing the further field winding substantially in accordance with the voltage applied to the driving motor armature to oppose the field energization of the first and second regulating generator field windings, said first and second field windings of the regulating generator being connected to provide cumulative field excitation, means for energizing the regulating generator and the loop circuit to start the elevator car, means responsive to arrival of said elevator car while traveling at substantial speed at a point a predetermined distance in advance of a landing at which it is to stop for modifying the energization of the regulating generator to slow said elevator car, and means responsive to arrival of said elevator car at a point nearer than said predetermined point to said last-named landing for applying said brake mechanism.

36. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said motive means comprising a direct-current main generator having an armature, a first field winding and a second field winding, connections connecting the generator armature and the armature of the driving motor in a loop circuit, said control means further including a regulating generator having an armature and first and second field windings, a bridge circuit having first, second, third and fourth arms connected consecutively in a bridge ring, the first arm including the first field windings and the third arm including the second field windings, said regulating generator armature being connected across a first diagonal of the bridge ring, and means selectively operable for modifying the ratio of the excitation of the regulating generator relative to the current flowing in said bridge ring.

37. In a motor drive system, a direct-current motor having an armature, a direct-current main generator having an armature and a field winding, connections connecting said armatures in a loop circuit and a regulating generator for controlling the energization of said field winding, said regulating generator having first and second field-excitation means connected in series for energization by a common quantity, and selectively operable means for connecting only one of said field-excitation means for energization by said quantity.

38. In an elevator system for a structure having landings, an elevator car, motive means including a driving motor for moving the elevator car relative to the structure to serve the landings, and control means for stopping the elevator car at a predetermined landing of said structure, said control means comprising brake mechanism operable for producing a braking effort to stop the elevator car, said driving motor having a load dependent on the load of the car, load-responsive means for controlling the release of the brake mechanism, said load-responsive means being responsive to a first load on said driving motor for releasing the brake mechanism at a first rate, and said load-responsive means being responsive to a second load on the driving motor for releasing the brake mechanism at a second rate which is slower than the first rate.

39. In an elevator system for a structure having landings, an elevator car, motive means including a driving motor for moving the elevator car relative to the structure to serve the landings, and control means for stopping and leveling the elevator car at a predetermined landing of said structure, said control means comprising brake mechanism operable for producing a braking effort to stop the elevator car, said driving motor having a load dependent on the load of the car, load-responsive means for controlling the release of the brake mechanism, said load-responsive means being responsive to a first load on said driving motor for releasing the brake mechanism at a first rate, said load-responsive means being responsive to a second load on the driving motor for releasing the brake mechanism at a second rate which is slower than the first rate, and said load-responsive means being responsive to a third load for maintaining a partial application of the brake mechanism during leveling of the elevator car.

40. In an elevator system for a structure having landings, an elevator car, motive means including a driving motor for moving the elevator car relative to the structure to serve the landings, and control means for stopping the elevator car at a predetermined landing of said structure, said control means comprising leveling means for leveling the elevator car to a desired landing, said driving motor having a load dependent on the load of the car, load-responsive means, and means controlled by the load-responsive means when the elevator car is being releveled for energizing the driving motor with a first energization for a substantially balanced load on the driving motor and for energizing the driving motor with a second energization which is larger than the first energization if the load on the driving motor is substantially unbalanced in the hauling direction.

41. In an elevator system for a structure having landings, an elevator car mounted in a vertical hoistway for serving said landings, motive means including a driving motor for moving the elevator car relative to the structure to serve the landings, and control means for stopping the elevator car at a predetermined landing of said structure, said control means comprising brake mechanism operable for producing a braking effort to stop the elevator car, a plurality of magnetic members mounted on said structure in vertical alignment, each of the magnetic members being mounted on the structure adjacent a separate one of the landings and adjacent the path of travel of the elevator car, a plurality of inductor relays mounted on said elevator car in vertical alignment for movement into operative relationship with said magnetic members as the elevator car moves in the hoistway, said elevator car when accurately positioned at a desired landing positioning a first one and a second one of the inductor relays adjacent vertically-spaced ends of the magnetic member for such desired landing, a third one of said inductor relays being positioned intermediate said first and second inductor relays, each of said inductor relays when in effective condition being responsive to the presence in inductive relation of one of the magnetic members for operation, means operable for placing the inductor relays in effective and ineffective conditions, means responsive to operation of the first and second inductor relays in response to displacement of the elevator car from accurate registration with one of the landings at which it should be stopped for operating the motive means and braking means to place and maintain said elevator car in such accurate registration, and means effective during movement of the elevator car in response to arrival of the third one of the inductor relays in inductive relation relative to one of the magnetic members for one of the landings at which the elevator car is to stop for initiating a slowdown of the elevator car.

42. In an elevator system for a structure having landings, an elevator car mounted in a vertical hoistway for serving said landings, motive means including a driving motor for moving the elevator car relative to the structure to serve the landings, and control means for stopping the elevator car at a predetermined landing of said structure, said control means comprising brake mechanism operable for producing a braking effort to stop the elevator car, a plurality of magnetic members mounted on said structure in vertical alignment, each of the magnetic members being mounted on the structure adjacent a separate one of the landings and adjacent the path of travel of the elevator car, a plurality of inductor relays mounted on said elevator car in vertical alignment for movement into operative relationship with said magnetic members as the elevator car moves in the hoistway, said elevator car when accurately positioned at a desired landing positioning a first one and a second one of the inductor relays adjacent vertically-spaced ends of the magnetic member for such desired landing, a third one of said inductor relays being positioned intermediate said first and second inductor relays, each of said inductor relays when in effective condition being responsive to the presence in inductive relation of one of the magnetic members for operation, means operable for placing the inductor relays in effective and ineffective conditions, means responsive to operation of the first and second inductor relays in response to displacement of the elevator car from accurate registration with one of the landings at which it should be stopped for operating the motive means and braking means to place and maintain said elevator car in such accurate registration, means effective during movement of the elevator car in response to arrival of the third one of the inductor relays in inductive relation relative to one of the magnetic members for one of the landings at which the elevator car is to stop for initiating a slowdown of the elevator car, a fourth one of said inductor relays being positioned intermediate the first and third inductor relays, a fifth one of said inductor relays being positioned intermediate the second and third inductor relays, each of said fourth and fifth inductor relays being effective when operated for initiating a slowdown of the elevator car, and means operable to place the fourth and fifth inductor relays in effective condition only for travel of the elevator car for first and second directions of travel respectively of the elevator car.

43. In an elevator system for a structure having landings, an elevator car mounted in a vertical hoistway for serving said landings, motive means including a driving motor for moving the elevator car relative to the structure to serve the landings, and control means for stopping the elevator car at a predetermined landing of said structure, said control means comprising brake mechanism operable for producing a braking effort to stop the elevator car, a detector assembly mounted on the elevator car, said detector assembly comprising first, second, third, fourth and fifth detectors disposed successively in vertical alignment, and a common landing control member positioned in the hoistway to be reached successively by said detectors in one order for movement of the elevator car in the up direction and to be reached successively by the detectors in the reverse order for movement of the elevator car in the down direction, each of said detectors when in effective condition being responsive for operation to the presence of said common landing control member within detecting range.

44. In an elevator system for a structure having landings, an elevator car mounted in a vertical hoistway for serving said landings, motive means including a driving motor for moving the elevator car relative to the structure to serve the landings, and control means for stopping the elevator car at a predetermined landing of said structure, said control means comprising brake mechanism operable for producing a braking effort to stop the elevator car, a detector assembly mounted on the elevator car, said detector assembly comprising first, second, third, fourth and fifth detectors disposed successively in vertical alignment, a common landing control member positioned in the hoistway to be reached successively by said detectors in one order for movement of the elevator car in the up direction and to be reached successively by the detectors in the reverse order for movement of the elevator car in the down direction, each of said detectors when in effective condition being responsive for operation to the presence of said common landing control member within detecting range, and means operable for placing only the first, third, fourth and fifth of said detectors in effective condition for travel of the elevator car in the up direction and for placing only the fifth, third, second and first of said detectors in effective condition for travel of the elevator car in the down direction.

45. In an elevator system for a structure having landings, an elevator car mounted in a vertical hoistway for serving said landings, motive means including a driving motor for moving the elevator car relative to the structure to serve the landings, and control means for stopping the elevator car at a predetermined landing of said structure, said control means comprising brake mechanism operable for producing a braking effort to stop the elevator car, a detector assembly mounted on the elevator car, said detector assembly comprising first, second, third, fourth and fifth detectors disposed successively in vertical alignment, a common landing control member positioned in the hoistway to be reached successively by said detectors in one order for movement of the elevator car in the up direction and to be reached successively by the detectors in the reverse order for movement of the elevator car in the down direction, each of said detectors when in effective condition being responsive for operation to the presence of said common landing control member within detecting range, means operable for placing only the first, third, fourth and fifth of said detectors in effective condition for travel of the elevator car in the up direction and for placing only the fifth, third, second and first of said detectors in effective condition for travel of the elevator car in the down direction, means responsive to the successive operation of each of the first three of the detectors to operate for initiating successive slowdowns of the elevator car, and means responsive to the operation of the last of the detectors to operate in either direction of travel following the last-named slowdown for initiating the stopping of the elevator car at a predetermined position.

46. In an elevator system for a structure having landings, an elevator car mounted in a vertical hoistway for serving said landings, motive means including a driving motor for moving the elevator car relative to the structure to serve the landings, and control means for stopping the elevator car at a predetermined landing of said structure, said control means comprising brake mechanism operable for producing a braking effort to stop the elevator car, a detector assembly mounted on the elevator car, said detector assembly comprising first, second, third, fourth and fifth detectors disposed successively in vertical alignment, a common landing control member positioned in the hoistway to be reached successively by said detectors in one order for movement of the elevator car in the up direction and to be reached successively by the detectors in the reverse order for movement of the elevator car in the down direction, each of said detectors when in effective condition being responsive for operation to the presence of said common landing control member within detecting range, means operable for placing only the first, third, fourth and fifth of said detectors in effective condition for travel of the elevator car in the up direction and for placing only the fifth, third, second and first of said detectors in effective condition for travel of the elevator car in the down direction, means responsive to the successive operation of each of the first three of the detectors to operate for initiating successive slowdowns of the elevator car, and means responsive to the operation of the last of the detectors to operate in either direction of travel following the last-named slowdown for initiating the stopping of the elevator car at a predetermined position, said control means being responsive to operation of one of the first and fifth detectors upon displacement of the elevator car from said predetermined position for cooperating with the motive means to place and maintain the elevator car in such position.

References Cited in the file of this patent

UNITED STATES PATENTS

| Number | Name | Date |
|---|---|---|
| 2,403,125 | Santini | July 22, 1946 |
| 2,528,126 | Esselman | Oct. 31, 1950 |